United States Patent
Abercrombie et al.

(10) Patent No.: US 11,455,072 B2
(45) Date of Patent: *Sep. 27, 2022

(54) METHOD AND APPARATUS FOR ADDRESSING OBSTRUCTION IN AN INTERFACE

(71) Applicant: WEST TEXAS TECHNOLOGY PARTNERS, LLC, Waco, TX (US)

(72) Inventors: Nathan Abercrombie, Mountain View, CA (US); Theo Goguely, Sunnyvale, CA (US)

(73) Assignee: WEST TEXAS TECHNOLOGY PARTNERS, LLC, Waco, TX (US)

( * ) Notice: Subject to any disclaimer, the term of this patent is extended or adjusted under 35 U.S.C. 154(b) by 183 days.

This patent is subject to a terminal disclaimer.

(21) Appl. No.: 16/393,572

(22) Filed: Apr. 24, 2019

(65) Prior Publication Data
US 2019/0250792 A1 Aug. 15, 2019

Related U.S. Application Data

(63) Continuation of application No. 14/515,812, filed on Oct. 16, 2014, now Pat. No. 10,318,100.

(60) Provisional application No. 61/891,783, filed on Oct. 16, 2013.

(51) Int. Cl.
*G06F 3/04815* (2022.01)
*G06F 3/01* (2006.01)
*G06F 3/04842* (2022.01)

(52) U.S. Cl.
CPC .......... *G06F 3/04815* (2013.01); *G06F 3/013* (2013.01); *G06F 3/017* (2013.01); *G06F 3/04842* (2013.01)

(58) Field of Classification Search
CPC ...... G06F 3/04815; G06F 3/017; G06F 3/011; G06F 3/4842; G06F 3/17; G06F 3/013; G05T 19/006; G06T 19/00
See application file for complete search history.

(56) References Cited

U.S. PATENT DOCUMENTS

| | | | |
|---|---|---|---|
| 6,690,371 B1 * | 2/2004 | Okerlund | G06T 11/008 345/424 |
| 8,405,680 B1 * | 3/2013 | Cardoso Lopes | G06T 19/00 345/633 |
| 9,188,663 B2 | 11/2015 | Centen et al. | |
| 9,341,849 B2 | 5/2016 | Wong et al. | |
| (Continued) | | | |

*Primary Examiner* — Eric J Yoon
(74) *Attorney, Agent, or Firm* — Whiteford, Taylor & Preston, LLP; Gregory M. Stone

(57) ABSTRACT

A user, a manipulator such as a hand, and at least one entity such as a virtual or augmented reality object are in an interface such as a 3D environmental interface. The manipulation distance is the distance between a reference feature of the user and a manipulation feature of the manipulator. The entity distance is the distance between the reference feature and an entity feature of the entity. When the manipulation distance becomes greater than the entity distance, the entity is caused to fade, disappear, move out of the way, shrink, etc. so as to be less of an obstruction to the user's field of view, for example to avoid obstructing more distant entities. Other factors than the manipulation distance and entity distance may be considered in determining whether to reduce the obstructivity of the entity, and exceptions to the obstruction relation may be considered.

20 Claims, 19 Drawing Sheets

(56) References Cited

U.S. PATENT DOCUMENTS

| | | | |
|---|---|---|---|
| 2002/0044152 A1 | 4/2002 | Abbott, III et al. | |
| 2002/0122038 A1 | 9/2002 | Cowperthwaite | |
| 2009/0027337 A1* | 1/2009 | Hildreth | G06F 3/0482 |
| | | | 345/158 |
| 2013/0293468 A1 | 11/2013 | Perez et al. | |
| 2014/0098088 A1* | 4/2014 | Ryu | G06T 19/006 |
| | | | 345/419 |
| 2014/0282220 A1* | 9/2014 | Wantland | G06F 3/011 |
| | | | 715/782 |
| 2015/0288944 A1* | 10/2015 | Nistico | G06T 15/20 |
| | | | 345/156 |

* cited by examiner

METHOD AND APPARATUS FOR ADDRESSING OBSTRUCTION IN AN INTERFACE

CROSS-REFERENCE TO RELATED APPLICATION

This application is a continuation of U.S. patent application Ser. No. 14/515,812, filed Oct. 16, 2014, which claims the benefit of U.S. Provisional Application No. 61/891,783 filed on Oct. 16, 2013, which is hereby incorporated by reference for all purposes.

FIELD OF THE INVENTION

This invention relates to three dimensional interfaces adapted to support entities therein. More particularly, this invention relates to approaches for user interaction with entities within three dimensional interfaces that reduce and/or avoid obstructions posed by such entities.

DESCRIPTION OF RELATED ART

A user interface may serve as a space or environment wherein a user interacts with some system, for example receiving data from that system and/or sending instructions to the system. The term is frequently applied to the use of computers and other information systems.

Three dimensional interfaces pose certain challenges with regard to visibility. For a two dimensional interface, e.g. one displayed on a screen, all icons, files, or other entities therein are at substantially the same distance from the screen surface, however for three dimensional interfaces this may not be the case. That is, with the addition of a depth dimension, it is potentially possible for entities to be at different depths.

As a consequence, it is possible for entities that are nearby to partially or fully obscure entities that are more distant. The potential for obstruction may become more pronounced as the number of entities present in an interface increases, and/or as the depth of the interface increases (i.e. if entities can be stacked deeply, the chances that one such entity may obscure another entity may potentially increase).

BRIEF SUMMARY OF THE INVENTION

The present invention contemplates a variety of systems, apparatus, methods, and paradigms for addressing the potential obstructivity of entities within an interface, that is, the degree to which those entities can and/or do obstruct content (if any) that is disposed behind those entities.

In one embodiment of the present invention, a machine-implemented method is provided that includes determining a manipulation distance between a reference feature associated with a user and a manipulation feature associated with a manipulator, determining an entity distance between the reference feature and an entity feature for an entity, the entity including a visual component, and evaluating an obstruction relation including the manipulation distance and the entity distance. If the obstruction relation is evaluated to be positive, a response is executed, the response including reducing the visual obstructivity of the entity relative to the user.

The obstruction relation may include a comparison of the manipulation distance and the entity distance. The manipulation distance may be required to be greater than the entity distance for the obstruction relation to be positive. The manipulation distance being greater than the entity distance may be sufficient for the obstruction relation to be positive. The manipulation distance being greater than the entity distance may be not sufficient for the obstruction relation to be positive.

The method may include determining an exception distance between the manipulation feature and the entity feature, with the obstruction relation further including the exception distance.

If the exception distance is less than a minimum exception distance, the obstruction relation may be negative. The minimum exception distance may be a linear distance and/or an angular distance. The minimum exception distance may be a function of the entity distance.

If the exception distance is greater than a maximum exception distance, the obstruction relation is negative. The maximum exception distance may be a linear distance and/or an angular distance. The maximum exception distance may be a function of the entity distance.

The method further may include determining at least one exception factor, with the obstruction relation including at least one exception factor, wherein if the exception factor is satisfied the obstruction relation is negative.

The method may include determining an exception construct, with the exception factor including disposition of the manipulation point within the exception construct, such that if the manipulation point is within the exception construct the obstruction relation is negative.

The exception factor may include a user input, wherein if the user input is executed the obstruction relation is negative. The user input may be a hand posture, hand gesture, eye posture, eye gesture, and/or voice command.

The obstruction factor may include a minimum manipulation distance, such that if the manipulation distance is less than the minimum manipulation distance the obstruction relation is negative. The exception factor may include a maximum manipulation distance, such that if the manipulation distance is greater than the maximum manipulation distance the obstruction relation is negative.

The exception factor may include a minimum entity distance, such that if the entity distance is less than the minimum entity distance the obstruction relation is negative. The exception factor may include a maximum entity distance, such that if the entity distance is greater than the maximum entity distance the obstruction relation is negative.

If the response is executed, the obstruction relation may be evaluated thereafter relation using a prior entity distance in place of the entity distance, the prior entity distance including a distance between the reference feature and a position of the manipulation feature prior to executing the response.

In another embodiment of the present invention, a machine-implemented method is provided that includes determining a manipulation distance between a reference feature associated with a user and a manipulation feature associated with a manipulator, determining an entity distance between the reference feature and an entity feature associated with an entity, the entity including a visual component. If the manipulation distance is greater than the entity distance, a response is executed, the response including reducing a visual obstructivity of the entity relative to the user.

The reference feature may be a point, a surface, and/or a solid. The reference feature may be selectable by the user. The manipulation feature may be a point, a surface, and/or a solid. The manipulation feature may be selectable by the user. The entity feature may be a point, a surface, and/or a solid. The entity feature may be selectable by the user.

The reference feature may substantially coincide with the geometric center of the user's body. The reference feature may substantially coincide with the geometric center of the user's head. The reference feature may substantially coincide with one of the user's eyes and/or retinas. The reference feature may substantially coincide with the a midpoint between the user's eyes.

The manipulation feature may substantially coincide with the user's hand. The manipulation feature may substantially coincide with the user's fingertip. The manipulation feature may substantially coincide with the tip of a stylus held by the user.

The entity feature may substantially coincide with the geometric center of the entity. The entity feature may substantially coincide with the surface of the entity. The entity feature may substantially coincide with a surface outwardly offset from the entity.

If the manipulation distance is greater than the entity distance by at least a trigger measure, the response may be executed, while if the manipulation distance is not greater than the entity distance by at least the trigger measure, the response may not be executed. The trigger measure may include an absolute distance. The trigger measure may include a proportional distance.

The response may include decreasing an opacity of the entity, decreasing the opacity to substantially zero, de-resolving the entity, deleting the entity, decreasing a size of the entity, and/or changing a position of the entity.

The response may include angularly displacing the entity about an axis substantially coinciding with the reference feature. The response may include displacing the entity at least 60 degrees. The response may include displacing the entity at least 120 degrees. The response may include displacing the entity at least by an angle such that the entity is substantially outside a field of view of the user. The response may include displacing the entity such that the entity is substantially outside a field of view of the user.

The entity may be an augmented reality entity and/or a virtual reality entity. The entity may be a light emission, a light projection, and/or a hologram.

The method may include determining a plurality of entity distances between the reference feature and a plurality of entity features for a plurality of entities, each of the entities including visual components. If for any of the entities the manipulation distance is greater than the entity distance, a response may be executed, the response including reducing a visual obstructivity relative to the user of the any of the entities.

If a distance between the manipulation feature and the entity feature is less than an exception distance, the response may not be executed. The exception distance may be a linear distance. The exception distance may be an angular distance.

If the manipulation feature is within an exception construct for the entity, the response may not be executed.

The method may include determining the facing of the user, and if the facing of the user is substantially aligned with the entity, not executing the response. The method may include determining a direction of the line of sight of the user, and if the line of sight of the user is substantially aligned with the entity, not executing the response.

If the entity is active, the response may not be executed. If the entity was addressed within an exception time, the response may not be executed.

In another embodiment of the present invention, an apparatus is provided that includes a processor, at least one sensor in communication with the processor, and an outputter in communication with the sensor. The sensor is adapted to determine a manipulation distance between a reference feature associated with a user and a manipulation feature associated with a manipulator. The sensor is adapted to determine an entity distance between the reference feature and an entity feature associated with an entity, the entity including a visual component. The processor is adapted to determine whether the manipulation distance is greater than the entity distance, and to determine a reduced obstructivity of the entity relative to the user if the manipulation distance is greater than the entity distance. The outputter is adapted to reduce the visual obstructivity of the entity.

The sensor may be an imager, a stereo pair of imagers, a depth sensor, a structured light sensor, and/or a time of flight sensor.

The output may be a visual display, an optical see-through visual display, a virtual see-through visual display, and a stereo visual display.

At least a portion of the apparatus may be disposed on a head mounted display.

In another embodiment of the present invention, an apparatus is provided that includes a processor, at least one sensor in communication with the processor, and an outputter in communication with the sensor. The sensor is adapted to determine a position of a reference feature associated with a user. The sensor is adapted to determine a position of a manipulation feature associated with a manipulator. The sensor is adapted to determine a position of an entity feature associated with an entity, the entity including a visual component. The processor is adapted to determine whether a manipulation distance between the reference feature and the manipulation feature is greater than an entity distance between the reference feature and the entity feature, and to determine a reduced obstructivity of the entity relative to the user if the manipulation distance is greater than the entity distance. The outputter is adapted to reduce the visual obstructivity of the entity.

In another embodiment of the present invention, an apparatus is provided that includes means for determining a manipulation distance between a reference feature associated with a user and a manipulation feature associated with a manipulator, means for determining an entity distance between the reference feature and an entity feature associated with an entity, the entity including a visual component, and means for executing a response if the manipulation distance is greater than the entity distance, the response including reducing a visual obstructivity of the entity relative to the user.

BRIEF DESCRIPTION OF THE SEVERAL VIEWS OF THE DRAWINGS

Like reference numbers generally indicate corresponding elements in the figures.

DETAILED DESCRIPTION OF THE INVENTION

Figure 1:
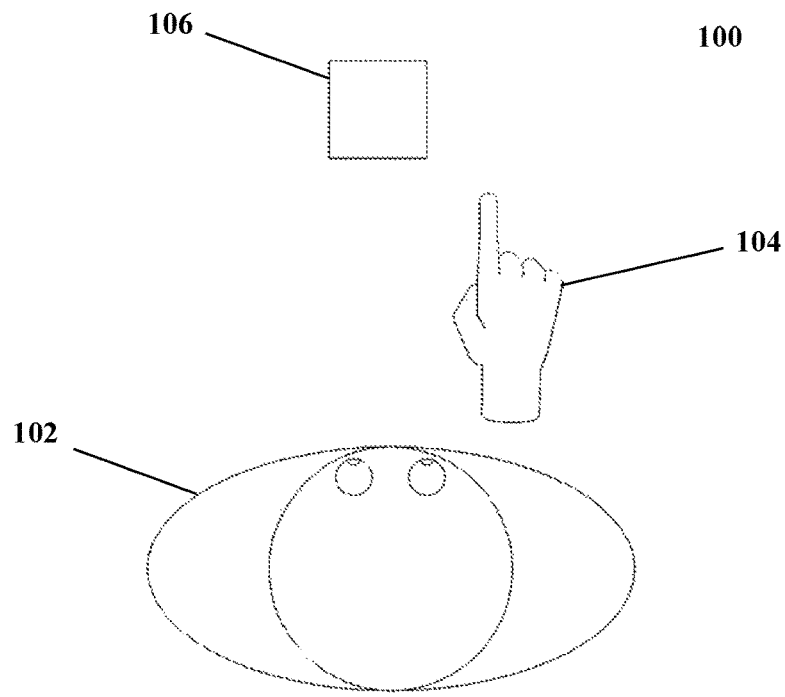
FIG. 1 shows an example embodiment of an interface according to the present invention, with a user, a manipulator, and an entity therein.

With reference to FIG. 1, therein is shown a top-down schematic of an example embodiment of an interface 100 according to the present invention. An entity 106 is shown disposed within the interface 100. A user 102 with a manipulator 104 also is shown.

The interface 100 serves as an intermediary between users and some system, typically although not necessarily a computer system. The interface 100 may exist as an environment, typically though not necessarily a three dimensional environment, adapted for accepting entities 106 therein.

However, the interface 100 may not be an "object" in a strict sense, and as such may have no physical substance, no visible appearance, and/or no well-defined boundaries (although interfaces having physicality, a visible presence, and/or well-defined boundaries are not excluded). Rather, the interface 100 may be considered as a set of rules for interacting with some other system, and/or a space for interacting with that system, such systems including but not being limited to a computer system. Entities 106 may be disposed within the interface 100, but are not necessarily part of the interface. Likewise, users 102 and/or manipulators 104 may be present within an interface 100 without necessarily being part of the interface 100.

As an example, consider an interface 100 in the form of a three dimensional virtual environment as delivered via a stereo head-mounted display. Such an interface 100 may have no physical substance, existing (for at least certain embodiments) entirely as digital information delivered through visual displays, speakers, haptic feedback units, etc. Such an interface 100 may have no visible appearance; although there may be entities 106 disposed within and/or subject to the interface 100 and although certain of those entities 106 may themselves be visible, the interface 100 itself may or may not be visible. Further, such an interface 100 may not have well-defined boundaries, since at least for certain embodiments such a virtual environment might extend indefinitely, surrounding a user 104 wherever he or she may go (so long as the user 104 remains engaged with the interface 100, that is in this example continues utilizing the head-mounted display).

For this reason, the interface 100 is shown only as a space in FIG. 1 (and likewise in certain other figures herein).

It is emphasized that the user 102, the manipulator 104, and any entities 106 present within an interface 100 are not necessarily part of the interface 100, nor are any other objects that may be present within the space of the interface 100 therein necessarily part of the interface 100 (e.g. furniture, other persons, etc. that might exist within a real-world environment coincident with a virtual reality interface, augmented reality interface, etc.).

As illustrated in FIG. 1, although the user 102 is shown to be present within the interface 100, this is an example only, and is not required. For certain embodiments a user 102 may be present as an avatar, while for other embodiments a user 102 may not be present within the interface 100 at all.

Also as illustrated in FIG. 1, the manipulator 104 is a hand, i.e. a hand belonging to the user 102. For reasons of simplicity the hand is shown as a distinct body without clear physical attachment to the user 102, though of course in practice the manipulator 104 being engaged by and/or attached to the user 102 is not precluded. In addition, although the manipulator 104 is shown as a hand in FIG. 1 this is an example only. Other manipulators, including but not limited to feet, eyes (e.g. used as pointers, for gesturing, etc.) and/or lines of sight, other body parts, a stylus, etc. may be equally suitable. In addition, for at least certain embodiments virtual manipulators 104 may be suitable, that is, manipulators that exist as constructs but that may not be physically present and/or that may not have a physical presence. For example, the hand of an avatar, a disembodied virtual hand, a cursor, etc. may be suitable for use as a manipulator.

With regard to the present invention, the term "entity" encompasses constructs that are and/or represent one or more objects, phenomena, locales, environments, etc., as may be accepted with the interface 100, interact with the interface 100, and/or manipulated within the interface 100. Depending on the particulars of an embodiment and the spaces therein, entities 106 may be physical entities, virtual reality entities, augmented reality entities, and/or other entities (e.g. a freestanding light effect or hologram, which might in some circumstances arguably be considered non-physical even if the light thereof exists within physical reality).

Typically, although not necessarily, virtual and/or augmented reality entities within an interface 100 may be generated and/or controlled by the interface, and/or by a processor that also generates and/or controls the interface itself.

The entity 106 as shown in FIG. 1 is present only for illustrative purposes, and is not meant to visually represent any particular entity. However, as a more concrete example, for an interface 100 with a virtual environment, entities 106 might include but are not limited to text, images, icons for data files and/or programs, virtual objects appropriate to some virtual environment (e.g. a virtual treasure chest in a pirate game), images, sounds, lighting effects and/or other visual effects, wireframes, models, avatars e.g. representing other users, virtual persons, virtual creatures, etc. The aforementioned are examples only, and other arrangements may be equally suitable.

The present invention is not particularly limited with regard to the number, type, arrangement, etc. of entities 106 that may be present within an interface at any time, nor with regard to the number, type, etc. of users 102 and/or manipulators 104, nor with regard to the type of interface 100 itself.

Figure 2:
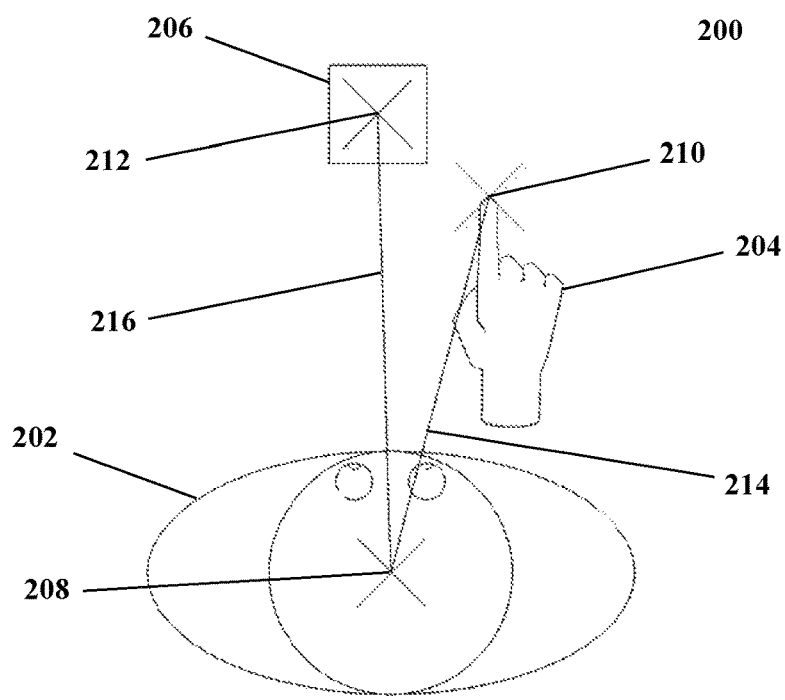
FIG. 2 shows an embodiment of an interface according to the present invention, showing features and distances therein.

Turning now to FIG. 2, therein a top-down schematic of another example embodiment of an interface 200 according to the present invention is shown. An entity 206 is shown disposed within the interface 200. A user 202 with a manipulator 204 also is shown in FIG. 2. The arrangement shown in FIG. 2 is at least somewhat similar to that shown in FIG. 1.

However, FIG. 2 also illustrates several features not explicitly marked in FIG. 1. Namely, a reference feature 208, a manipulation feature 210, and an entity feature 212 are shown as X marks associated with the user 202, the manipulator 204, and the entity 206 respectively. Also, the distance between the reference feature 208 and the manipulation feature 210 is shown and identified as the manipulation distance 214, and the distance between the reference feature 208 and the entity feature 212 is shown and identified as the entity distance 216.

The reference feature 208, manipulation feature 210, and entity feature 212 are explanatory aids for understanding the function of the present invention, and/or registration points for determining distances. As such, the reference feature 208, manipulation feature 210, and entity feature 212 are shown in FIG. 2 for purposes of clarity, so that clear statements may be made regarding questions such as "where is the user?", "what is the distance between the user and a particular entity?", and so forth.

The reference feature 208, manipulation feature 210, and entity feature 212 may have no visibility and/or may have no physical substance, and indeed may not even exist as data constructs (though embodiments utilizing a reference feature 208, manipulation feature 210, and/or entity feature 212 that is visible, physical, and/or a data construct also is not excluded). Rather, the reference feature 208, manipulation feature 210, and entity feature 212 may be illustrative only.

For clarity, the reference feature 208, manipulation feature 210, and entity feature 212 are shown in FIG. 2 as being points in space. For certain embodiments of the present invention it may be useful to define such features 208, 210, and 212 as points, e.g. since positions of points and distances between points can under at least some circumstances be expressed in a relatively simple and/or unambiguous fashion. However, as will be described in greater detail subsequently herein, this is an example only, and other arrangements may be equally suitable.

The manipulation distance 214 and the entity distance 216 are representations of distance among the reference feature 208, manipulation feature 210, and entity feature 212. Although illustrated in FIG. 2 for clarity, the manipulation distance 214 and the entity distance 216 are not necessarily visible, may have no physical form, and/or may not exist even as virtual reality entities and/or augmented reality entities. Rather the manipulation distance 214 and the entity distance 216 are distances, namely the distance between the user 202 and the manipulator 204, and the distance between the user 202 and the entity 206, respectively (or more particularly, between the reference feature 208 and the manipulation feature 210, and between the reference feature 208 and the entity feature 212).

Attention is called to the relationship between the manipulation distance 214 and the entity distance 216 as shown in FIG. 2. Specifically, as may be observed through inspection the manipulation distance 214 is visibly less than the entity distance 216.

Figure 3:
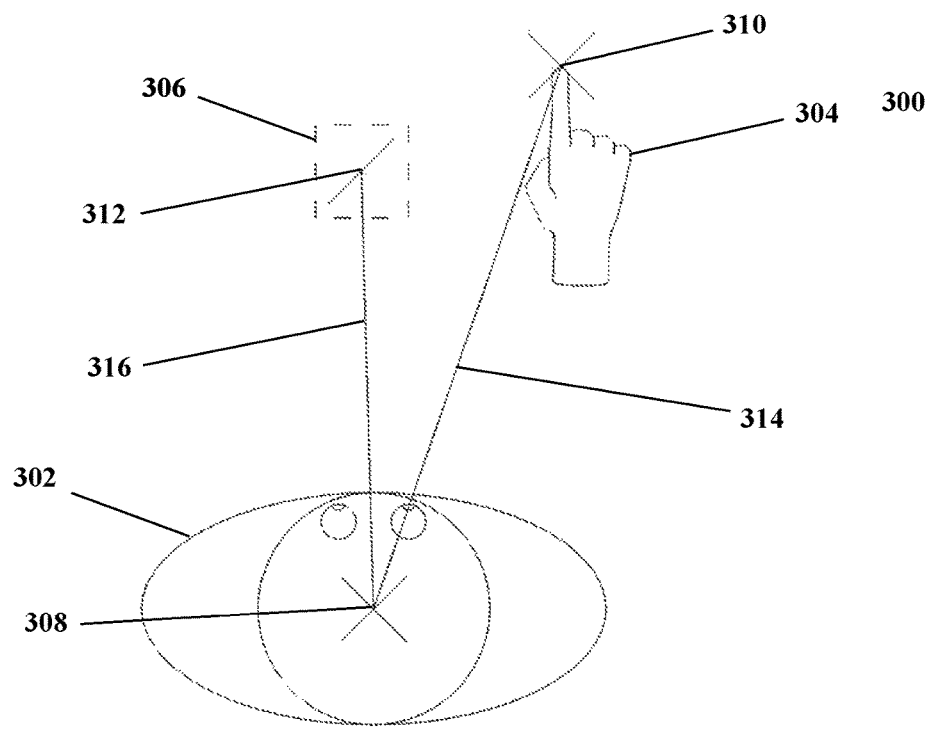
FIG. 3 shows an embodiment of an interface according to the present invention, with the entity therein having a reduced obstructivity.

Turning now to FIG. 3, an arrangement at least somewhat similar to that in FIG. 2 is shown therein. FIG. 3 includes an interface 300, a user 302, a manipulator 304, and an entity 306. A reference feature 308, a manipulation feature 310, and an entity feature 312 are also shown, along with a manipulation distance 314 and an entity distance 316.

However, a comparison of FIG. 3 with FIG. 2 reveals several differences. Notably, in FIG. 3 the manipulator 304 is farther from the user 308 than in FIG. 2, which is to say that the manipulation distance 314 in FIG. 3 is greater than the manipulation distance 214 in FIG. 2. Viewing FIG. 2 and FIG. 3 as a series, it may be considered that FIG. 3 represents a state of a system similar to that of FIG. 3, but after the manipulator 304 has been extended forward by some distance.

In addition, examination of FIG. 3 also reveals that the manipulation distance 314 therein is visibly greater than the entity distance 316. This is in contrast to the arrangement of FIG. 2, wherein the manipulation distance 214 therein is visibly greater than the entity distance 216.

Furthermore, in FIG. 3 the entity 306 may be seen to be depicted with a dashed outline, wherein in FIG. 2 the entity 206 therein may be seen to be depicted with a solid line. This is representative of a change in the entity 306, wherein the obstructivity of the entity 306 in FIG. 3 is less than the obstructivity of the entity 206 in FIG. 2. For example, the dashed line may be considered to represent that the entity 306 has been made transparent, sometimes referred to as "being ghosted", thereby presenting less of a potential obstruction to the viewer 302.

The term "obstructivity" is used herein to refer to the potential and/or actual property of an entity to obstruct line of sight. A reduction in obstructivity typically corresponds with some change in the size, position, opacity/transparency, etc. of the entity in question. That is, reducing the size of an entity would under at least some circumstances reduce the degree to which that entity serves as an obstruction, and thus reduces the obstructivity of the entity. Similarly, moving the entity out of the way (i.e. away from a line of sight that is of interest), making the entity transparent (or more transparent if already transparent to some degree), etc. would also reduce the obstructivity of the entity. For certain entities, including but not limited to virtual reality entities and augmented reality entities, deleting the data construct that the entity represents would constitute a reduction in obstructivity, as would ceasing to resolve or otherwise display the entity within the virtual or augmented reality environment (sometimes referred to as de-resolving or "de-rezzing" such an entity).

Typically, although not necessarily, such decreases in obstructivity may be implemented within a processor, such as a processor controlling and/or generating a virtual reality environment or augmented reality environment. However, other arrangements may be equally suitable (e.g. changing the output intensity of a projection on a screen, a hologram, etc.).

Functionally, then, with reference to FIG. 2 and FIG. 3, in the example embodiment of the present invention as illustrated therein, when the manipulation distance 314 is greater than the entity distance 316, the obstructivity of the entity 306 is reduced. As a more concrete example, if a user 302 utilizes his or her hand as a manipulator 304 within an interface 300 according to the present invention, when the user 302 extends his or her hand 304 past an entity 306, that entity 306 changes so as to be less likely to obstruct whatever may exist (if anything) beyond that entity 306, from the point of view of the user 302.

It is noted that changes in obstructivity to an entity 306 are not necessarily permanent (though permanent changes also are not excluded). Once conditions change—for example, once the manipulator 304 moves so that the manipulation distance 314 is no longer greater than the entity distance 316—the entity 306 may be returned to the original condition thereof, in at least some embodiments. More concretely, if the entity 306 fades out when the user 302 extends his or her hand 304, the entity 306 may fade back in when the user 302 withdraws his or her hand 304.

Figure 4:
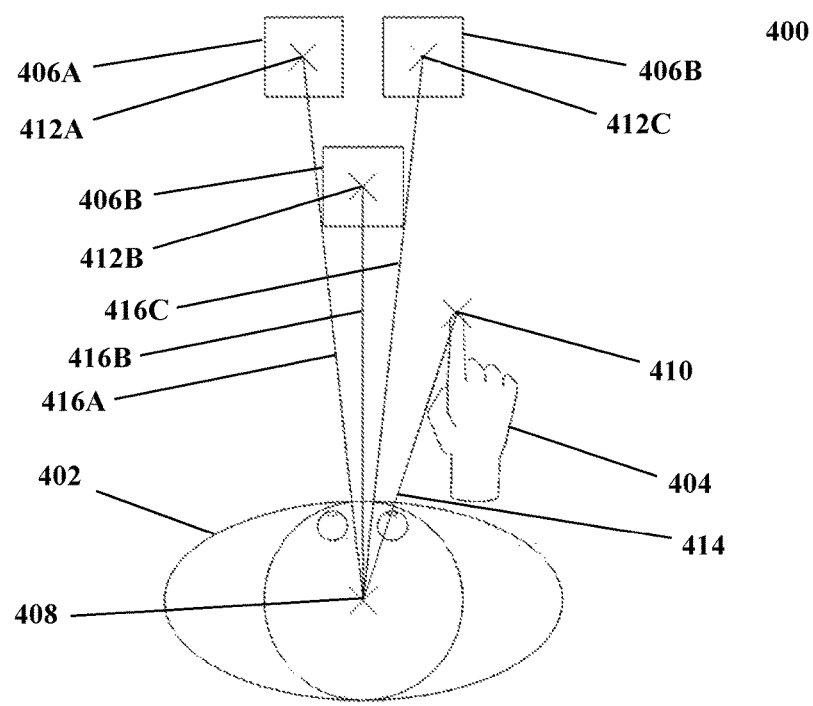
FIG. 4 shows an embodiment of an interface according to the present invention, with multiple entities therein.

Moving on to FIG. 4, therein is shown an interface 400, along with a user 402, a manipulator 404, and first, second, and third entities 406A, 406B, and 406C. A reference feature 408, a manipulation feature 410, and entity features 412A, 412B, and 412C are also shown, along with a manipulation distance 414 and entity distances 416A, 416B, and 416C.

As may be seen, the manipulation distance 414 is less than any of the entity distances 416A, 416B, and 416C associated with of the entities entity distances 406A, 406B, and 406C, respectively.

Figure 5:
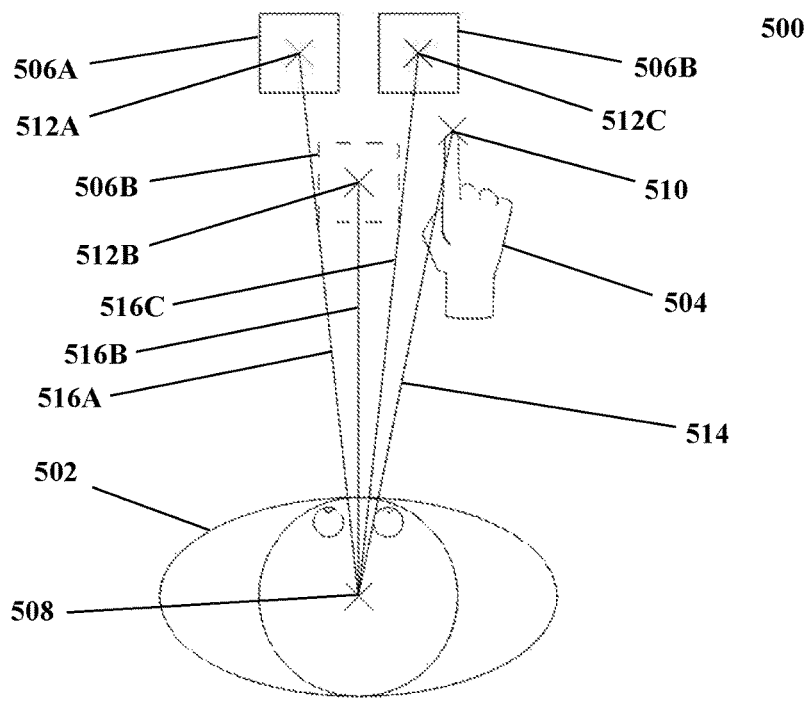
FIG. 5 shows an embodiment of an interface according to the present invention with multiple entities therein, with one entity therein having a reduced obstructivity.

Moving on to FIG. 5, therein is shown an arrangement at least somewhat similar to that in FIG. 4, with an interface 500, along with a user 502, a manipulator 504, and first, second, and third entities 506A, 506B, and 506C. A reference feature 508, a manipulation feature 510, and entity features 512A, 512B, and 512C are also shown, along with a manipulation distance 514 and entity distances 516A, 516B, and 516C.

However, as may be seen, and differing from the arrangement in FIG. 4, in FIG. 5 the manipulation distance 514 is greater than the entity distance 516B for entity 506B, while the manipulation distance 514 is less than the entity distances 516A and 516C for entities 506A and 506C, respectively.

In the arrangement of FIG. 5, with the manipulation distance 514 greater than the entity distance 516B for entity 506B, entity 506B is depicted with a dashed outline representing reduced obstructivity. Thus, as rioted with regard to FIG. 2 and FIG. 3, as the manipulator 504 moved so that the manipulation distance 506B became greater than the entity distance 516B for one of the entities 506B, the obstructivity of that entity 506B was reduced in response.

It is noted that as shown in FIG. 5, the effect of reduced obstructivity is specific to one entity 506B. Entity 506B is reduced in obstructivity because the manipulation distance 514 is less than the entity distances 516B associated with entity 506B. However, entities 506A and 506C are not reduced in obstructivity, because the manipulation distance 514 is less than the entity distances 516A and 516C associated with entities 506A and 506C.

It will be understood that, in cases including but not limited to those wherein multiple entities are present, reducing obstructivity of entities close to a viewer may improve the visibility of entities that otherwise might be obstructed. For example, again considering an arrangement wherein a user 502 utilizes his or her hand as a manipulator 504 within an interface 500 according to the present invention, when the user 502 extends his or her hand 504 past a relatively near entity 506B, that near entity 506B changes so as to be less likely to obstruct more distant entities 506A and 506C. Furthermore, if the user 502 is attempting to interact with one of those more distant entities 506A and 506C, then a decrease in the obstructivity of the nearer entity 506B facilitates such interaction with one of those more distant entities 506A and 506C, since those more distant entities 506A and 506C are then less likely to be obstructed by the nearer entity 506B.

In broad terms, then, the arrangement as shown in FIG. 4 and FIG. 5 is one wherein as a user reaches beyond entities with a hand or other manipulator, those entities shrink, move, disappear, fade, etc. so as to pose less obstruction for other entities. Under at least some circumstances it may be considered that, having reached beyond a particular entity, the user is not attempting to interact with that entity. In response, as the user reaches beyond an entity, that entity fades, disappears, moves, etc. to improve the visibility of other entities beyond. Through such an approach, entities for example at varying distances within a three dimensional environment may be readily addressed without obstruction, or with a lesser degree of obstruction, by fading, moving, etc. entities as the user's hand moves beyond those entities.

However, the preceding is an example only, and other arrangements may be equally suitable.

Figure 6:
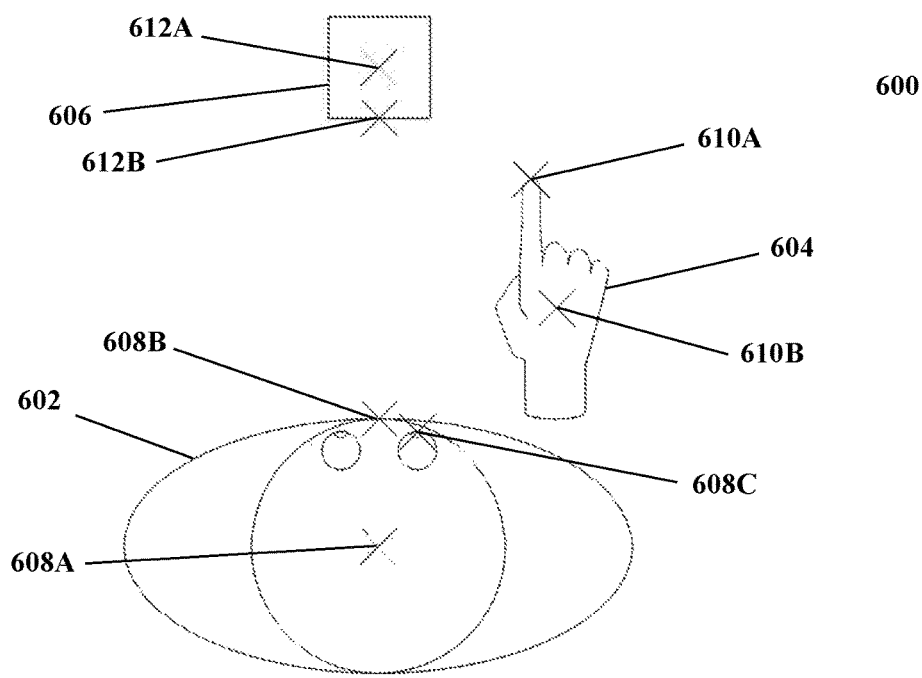
FIG. 6 shows an embodiment of an interface according to the present invention, showing multiple locations for reference features, manipulation features, and entity features.

Moving on to FIG. 6, as previously stated reference features, manipulation features, and entity features are explanatory aids for understanding the function of the present invention and/or registration points for determining distances. As such, the selection of precisely where such features are considered to be may be at least somewhat flexible. The arrangement in FIG. 6 shows various example locations for reference features, manipulation features, and entity features.

FIG. 6 shows an arrangement with an interface 600, along with a user 602, a manipulator 604, and an entity 606.

The user 602 is marked with three different reference features 608A, 608B, and 608C. Reference feature 608A, for example, may be substantially aligned in at least two dimensions with the center of the head of the user 602; that reference feature 608A might alternately be aligned with the center of mass of the user 602, or with a projection of the center of mass of the user 602 against whatever surface the user 602 might be standing upon, etc. Reference feature 608B may be substantially aligned with a point between the eyes of the user 602, with a point on the front of the chest of the user 602, with a point on the nose-bridge of pair of glasses or a head-mounted display, etc. Reference feature 608C may be substantially aligned with a pupil in one of the eyes of the user 602, etc.

Other options may exist for positioning a reference feature besides those described above. The present invention is not particularly limited with regard to where reference features are positioned. Typically, though not necessarily, reference features will be positioned at readily identifiable locations, e.g. that are easily visible or otherwise sensible, that can be conveniently calculated or otherwise determined, etc. However, reference features are to at least some extent arbitrarily assigned, and may be selected for convenience and usefulness. So long as a reference feature provides some useful information regarding "where the user is" insofar as determining distances, substantially any feature and/or location, including but not limited to locations not on or within the user, may be utilized as a reference feature.

Similarly, the manipulator 604, shown in FIG. 6 as a hand, is marked with multiple manipulation features 610A and 610B. As illustrated, manipulation feature 610A may be considered to represent the tip of an index finger of the hand 604, while manipulation feature 610B may be considered to represent the center of mass of the hand 604. As described above with respect to reference features, other options may exist for positioning a manipulation feature besides those described above. The present invention is not particularly limited with regard to where manipulation features are positioned. Typically, though not necessarily, manipulation features will be positioned at readily identifiable locations, e.g. that are easily visible or otherwise sensible, that can be conveniently calculated or otherwise determined, etc. For example, fingertips or other end-effectors, or points associated therewith (e.g. a midpoint between two end-effectors such as two extended fingertips) may be suitable locations for manipulator features for certain embodiments of the present invention. However, manipulation features are to at least some extent arbitrarily assigned, and may be selected for convenience and usefulness. So long as a manipulation feature provides some useful information regarding "where the manipulator is" insofar as determining distances, substantially any feature and/or location, including but not limited to locations not on or within the manipulator, may be utilized as a manipulation feature.

Likewise, the entity 602 is marked with multiple manipulation features 612A and 612B. As illustrated, entity feature 612A may be considered to represent the center of mass of the entity 606, while entity feature 612B may be considered to represent a point on the surface of the entity 606.

As described above with respect to reference features and manipulation features, other options may exist for positioning an entity feature besides those described above. The present invention is not particularly limited with regard to where entity features are positioned. Typically, though not necessarily, entity features will be positioned at readily identifiable locations, e.g. that are easily visible or otherwise sensible, that can be conveniently calculated or otherwise determined, etc. However, entity features are to at least some extent arbitrarily assigned, and may be selected for convenience and usefulness. So long as an entity feature provides some useful information regarding "where the entity is" insofar as determining distances, substantially any feature and/or location, including but not limited to locations not on or within the entity, may be utilized as an entity feature.

In addition, the present invention is not limited only to a single reference feature, manipulation feature, and/or entity feature. While for certain embodiments it may be useful to define a position of a user, manipulator, and/or entity solely in terms of a single point or other structure, for other embodiments it may be equally useful to use multiple points or other structures to define any or all of a user, manipulator, and/or entity.

As already indicated, reference features, manipulation features, and entity features may be at least somewhat arbitrary. For at least certain embodiments of the present invention, it may be useful to enable users to select such features as is useful or convenient for a user's particular needs and preferences. For example, where one user might prefer to utilize a tip of his or her finger as a manipulation feature, another user might choose instead to utilize a center of his or her palm, etc.

Figure 7:
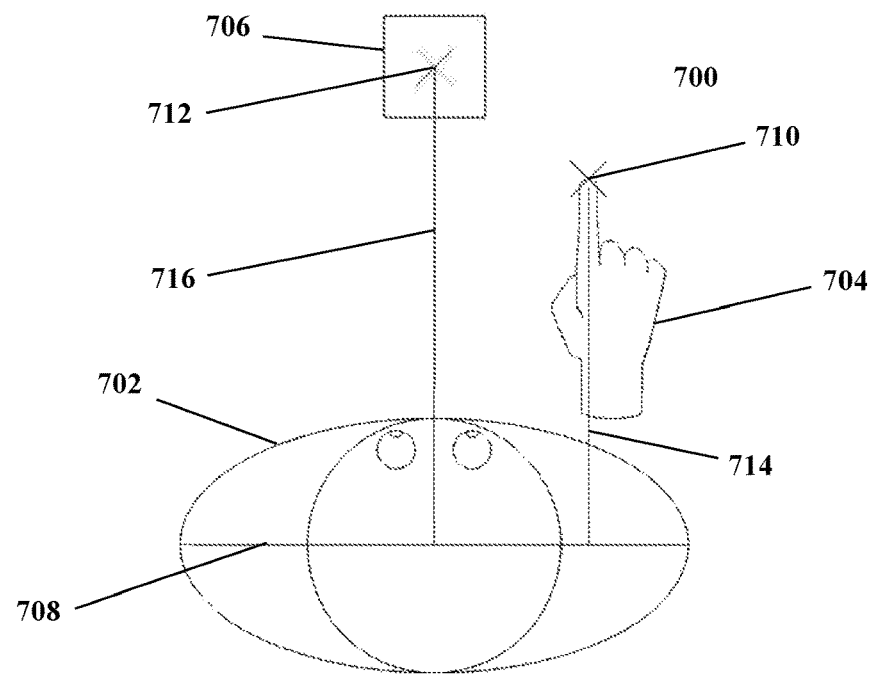
FIG. 7 shows an embodiment of an interface according to the present invention, showing a linear representation of a reference feature.

Turning now to FIG. 7, therein is shown another interface 700 according to the present invention. FIG. 7 includes a user 702, a manipulator 704, and an entity 706. A manipulation feature 710 and an entity feature 712 are also shown.

A reference feature 708 is also present in FIG. 7. However, as may be seen the reference feature 708 is not represented as a single point using an X mark, but rather is represented by a line running across the width of the user 702 as illustrated. The reference feature 708 as shown may be interpreted as a vertical plane coinciding with the center of mass of the user 702, or as a line running through the user 702 from side to side, etc.

It is emphasized, with reference to FIG. 7, that the present invention is not limited only to the use of points as a reference feature 708. Rather, other features, including but not limited to lines through and/or otherwise associated with the user 702, planes through and/or otherwise associated with the user 702, and the surface of the user 702 may be utilized as reference features 708 for at least some embodiments of the present invention.

Similarly, features other than points may be utilized for manipulation feature 710 and/or for an entity feature 712.

As is also shown in FIG. 7, the particulars of a reference feature 708, including but not limited to the geometry thereof, may to at least some extent affect the manipulation distance 714 and/or entity distance 716, for example with regard to the manner by which the manipulation distance 714 and/or entity distance 716 are conceptualized. Likewise, the particulars of a manipulation feature 710 and/or an entity feature 712, including but not limited to the geometry thereof, may similarly affect the manipulation distance 714 and/or entity distance 716 to at least some extent.

For example, as illustrated in FIG. 7, for a reference feature 708 that is considered to be a vertical plane extending through the center of mass of the user 702, the manipulation distance 714 and the entity distance 716 (that is, the distance between the reference feature 708 and the manipulation feature 710 and the distance between the reference feature 708 and the entity feature 712, respectively) will not be point-to-point distances, but rather may be evaluated as plane-to-point distances. Thus, as shown, the manipulation distance 714 is determined as the distance between a planar reference feature 708 and a point manipulation feature 710, and the entity distance 716 is determined based as the distance between a planar reference feature 708 and a point entity feature 712.

As a result, for the arrangement shown in FIG. 7 the manipulation distance 714 and the entity distance 716 are effectively linear distances along parallel paths, rather than being radial distances from some intersection point (as for example in FIG. 2). It will be understood that the nature of the reference feature 708, the manipulation feature 710, and the entity feature 712 may thus affect whether the manipulation distance 714 is greater than the entity distance 716 in a particular embodiment. It is conceivable, for example, that with certain configurations of user 702, manipulator 704, and entity 706, whether the manipulation distance 714 is greater than the entity distance 716 will be determined at least in part based on how and/or where the reference feature 708, the manipulation feature 710, and the entity feature 712 are defined. That is, for two identical arrangements of user, hand (manipulator), and entity, whether the hand is considered farther away from the user than the entity—and thus whether the entity is reduced in obstructivity could be determined based on whether (for example) the reference feature is a point or a plane.

Figure 8:
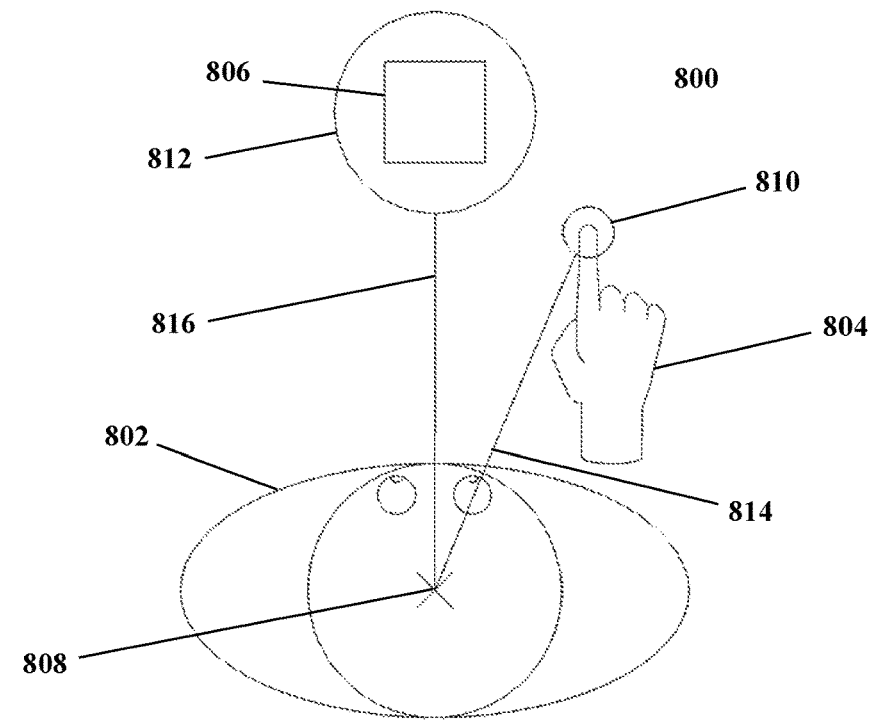
FIG. 8 shows an embodiment of an interface according to the present invention, showing circular representations of manipulation and entity features.

Moving on to FIG. 8, as previously stated reference features, manipulation features, and/or entity features are not required to be disposed on or in the user, manipulator, and entity respectively. An example arrangement wherein the manipulation feature and entity feature are not on or in the manipulator and entity respectively is shown therein.

In the arrangement of FIG. 8, an interface 800 is shown, and a user 802, a manipulator 804, and an entity 806. A reference feature 808 in the form of a point also is shown within the user 802.

However, the manipulation feature 810 is illustrated as a circle substantially enclosing the tip of the index finger of the hand (manipulator 810). This may be understood as a manipulation feature 810 in the form of a two dimensional ring, a spherical surface, a spherical solid, etc. Similarly, the entity feature 812 is illustrated as a circle substantially enclosing the entity 806, which may be understood as an entity feature 810 in the form of a two dimensional ring, a spherical surface, a spherical solid, etc.

As noted with regard to FIG. 7, the nature of the reference feature 808, the manipulation feature 810, and/or the entity feature 812 may affect determinations of the manipulation distance 814 and/or the entity distance 816. For example, for the arrangement shown in FIG. 8 the manipulation distance 814 and/or the entity distance 816 are point-to-sphere distances rather than point-to-point distances.

In addition, for at least certain embodiments the configuration of the reference feature 808, the manipulation feature 810, and/or the entity feature 812 may have other effects as well. For example, in a dynamic system such as a three dimensional interface, considering or defining a reference feature 808, manipulation feature 810, and/or entity feature 812 as a sphere may accommodate a degree of uncertainty in the precise position of users, manipulators, and/or entities, potentially improving the error-tolerance of the system over an arrangement that requires precise determination of point locations for a reference feature 808, manipulation feature 810, and/or entity feature 812. Since some degree of uncertainty may be unavoidable for a dynamic system such as a three dimensional interface, a capability for accommodating some level of uncertainty may be useful.

Figure 9:
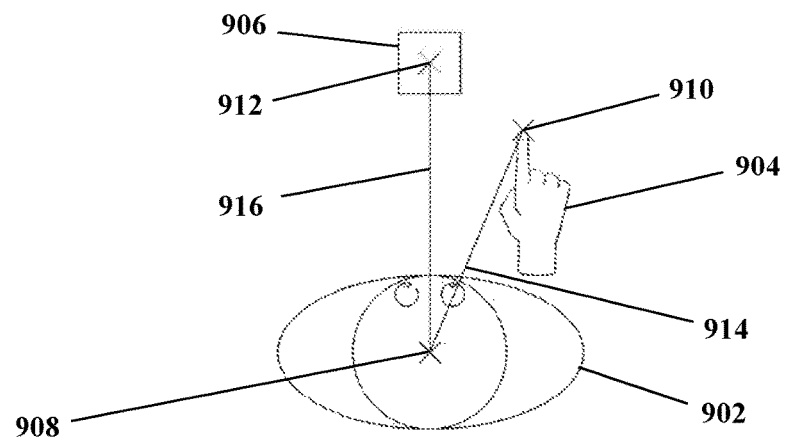
FIG. 9 shows an embodiment of an interface according to the present invention, with an entity therein at an initial state of obstructivity.

Referring now to FIG. 9, the present invention is not particularly limited with regard to how the obstructivity of an entity may be reduced. FIG. 9 shows an interface 900, with a user 902, a manipulator 904, and an entity 906, A reference feature 908, a manipulation feature 910, and an entity feature 912 are indicated by X marks, and the manipulation distance 914 and entity distance 916 are also shown therein. Attention is called to the relationship between the manipulation distance 914 and the entity distance 916, i.e. the manipulation distance 914 is less than the entity distance 916.

Figure 10A:
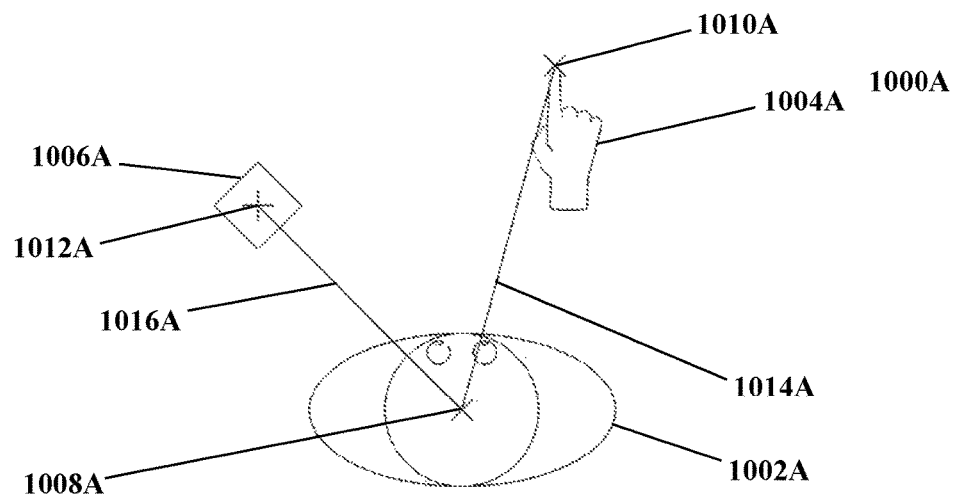
FIG. 10A through FIG. 10G show embodiments of an interface similar to that of FIG. 9, but with the entity therein at a reduced state of obstructivity.

Turning to FIG. 10A, an arrangement at least somewhat similar to FIG. 9 is shown therein, with an interface 1000A, a user 1002A, a manipulator 1004A, and an entity 1006A. A reference feature 1008A, a manipulation feature 1010A, and an entity feature 1012A are indicated by X marks, and the manipulation distance 1014A and entity distance 1016A are also shown therein.

As may be seen, in FIG. 10A the manipulation distance 1014A is greater than the entity distance 1016A. Thus according to the present invention, the obstructivity of the entity 1006A is to be reduced.

As may also be seen, the entity 1006A has been displaced from the position shown in FIG. 9, more particularly the entity 1006A has rotated or pivoted about an axis substantially aligned with the reference feature 1008A. Where the entity as shown in FIG. 9 previously was disposed substantially in front of the user therein, in FIG. 10A the entity 1006A is now offset approximately 45 degrees counterclockwise as seen in the top-down perspective therein. Through such a displacement, the entity 1006A now presents a reduced visual obstruction with regard to the user 1008A, that is, the obstructivity of the entity 1006A is reduced.

It will be understood that, for arrangements wherein an entity is displaced to reduce the obstructivity thereof, the position of the entity feature and/or the entity distance may change. At least some embodiments may maintain the new position in such instance, an example approach being described later herein with reference to FIG. 10G.

Figure 10B:
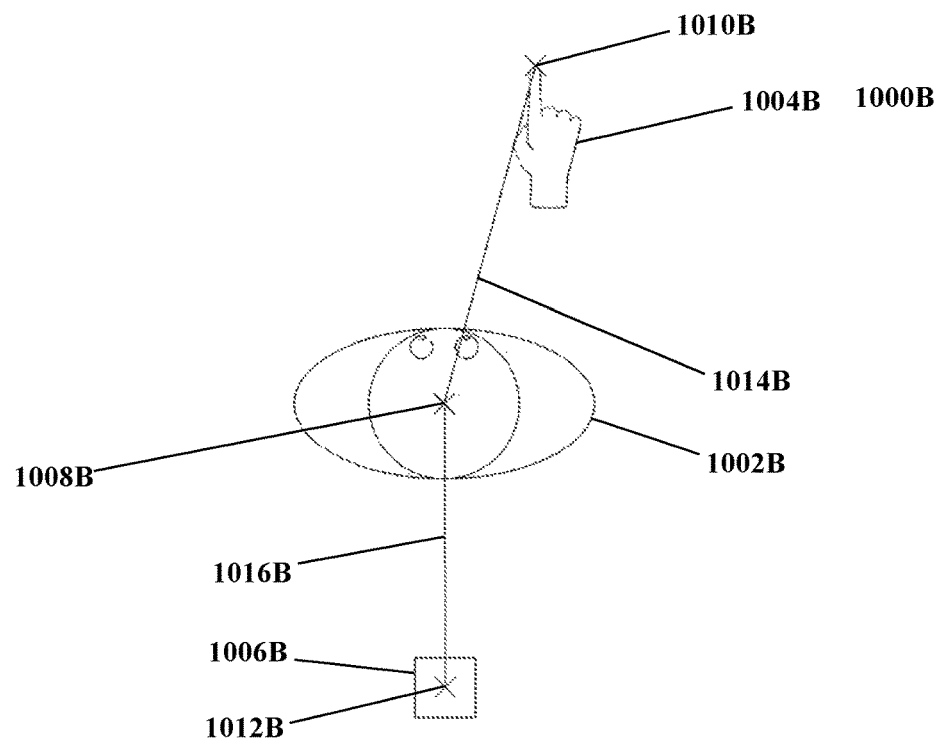

Returning to FIG. 10A, it is noted that the present invention is not particularly limited with regard to the degree of angular displacement of entities so as to reduce the obstructivity of those entities. For the arrangement shown in FIG. 10A, the entity 1006A therein has been displaced by approximately 45 degrees, however this is an example only. Other displacements may be used, whether greater or lesser than 45 degrees, e.g. 15 degrees, 30 degrees, 60 degrees, 90 degrees, 120 degrees, etc. With reference to FIG. 10B, an arrangement is shown in therein with an interface 1000B, user 1002B, manipulator 1004B, entity 1006B, reference feature 1008B, manipulation feature 1010B, an entity feature 1012B, manipulation distance 1014B, and entity distance 1016B. However, therein the entity 1006B is angularly displaced by approximately 180 degrees, such that the entity 1006B is substantially directly behind the user 1002B.

Figure 10C:
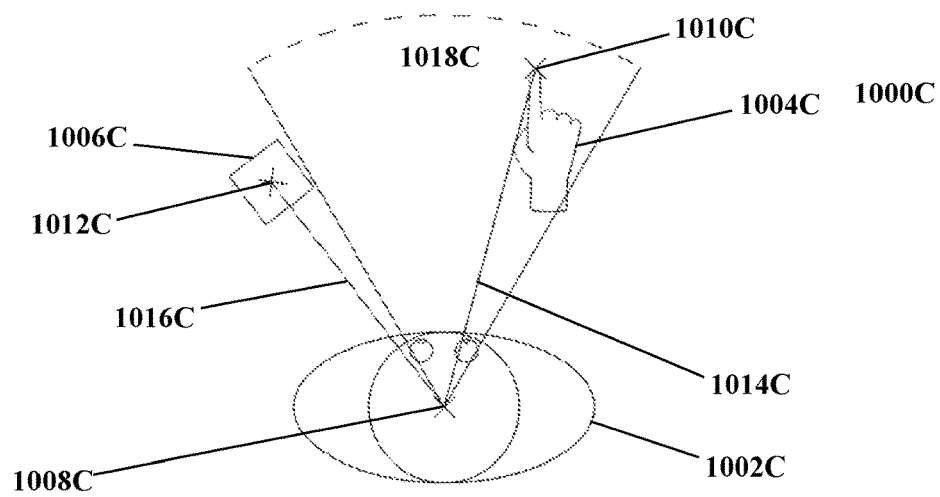

Although angular displacements may be determined numerically, e.g. 45 degrees as in FIG. 10A, the present invention is not limited only to specific numerical angular displacements. For example, angular displacement to match and/or accommodate user factors, environmental factors, etc. may also be suitable. Such an arrangement is shown in FIG. 10C. Therein is shown an interface 1000C, user 1002C, manipulator 1004C, entity 1006C, reference feature 1008C, manipulation feature 1010C, an entity feature 1012C, manipulation distance 1014C, and entity distance 1016C. In addition, the field of view 1018C of the user 1002C is indicated by a wedge with a dashed extremity.

In FIG. 10C, the entity 1006C therein is angularly displaced so as to be arranged substantially outside of the visual field 1018C of the user 1002C. From the point of view of the user 1002C, therefor, the visual obstruction presented by the entity 1006C is zero; even if the entity 1006C is still resolved, still opaque, etc., the entity is not viewable by the user 1002C, being outside of his or her visual field 1018C.

Figure 10D:
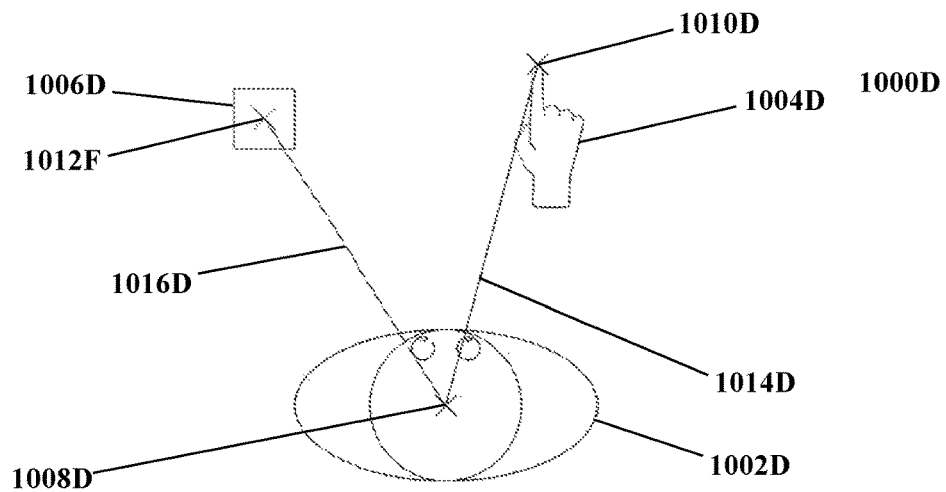

In another alternative, in FIG. 10D is shown an interface 1000D, user 1002D, manipulator 1004D, entity 1006D, reference feature 1008D, manipulation feature 1010D, an entity feature 1012D, manipulation distance 1014D, and entity distance 1016D. As may be seen from a comparison with FIG. 9, the entity 1006D in FIG. 10D is displaced substantially linearly leftward. The effect is not entirely dissimilar to an angular displacement, the result being that the obstructivity of the entity 1006D is reduced. Other motions, including but not limited to other translations and/or linear displacements, may also be equally suitable.

Figure 10E:
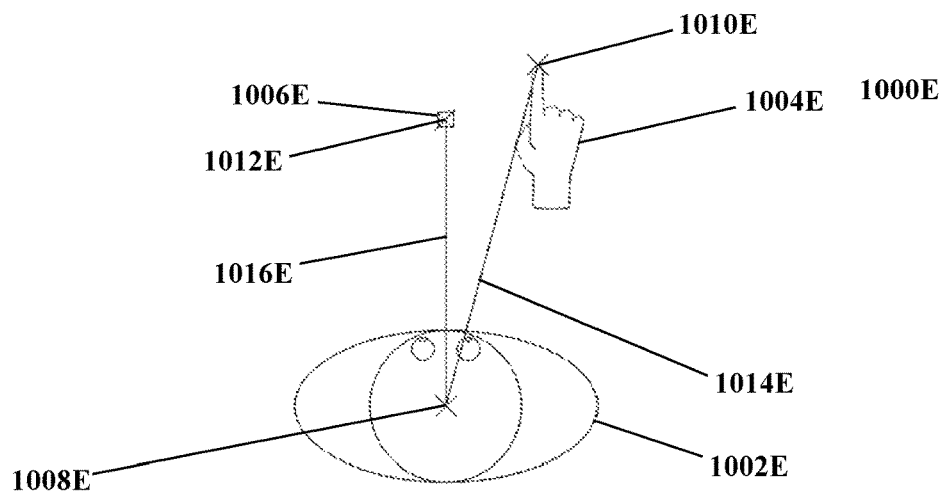

In yet another alternative, in FIG. 10E is shown an interface 1000E, user 1002E, manipulator 1004E, entity 1006E, reference feature 1008E, manipulation feature 1010E, an entity feature 1012E, manipulation distance 1014E, and entity distance 1016E. As may be seen from a comparison with FIG. 9, the entity 1006E in FIG. 10E is changed in size, more particularly reduced in size. Consequently, the obstructivity of the entity 1006E is reduced.

Figure 10F:
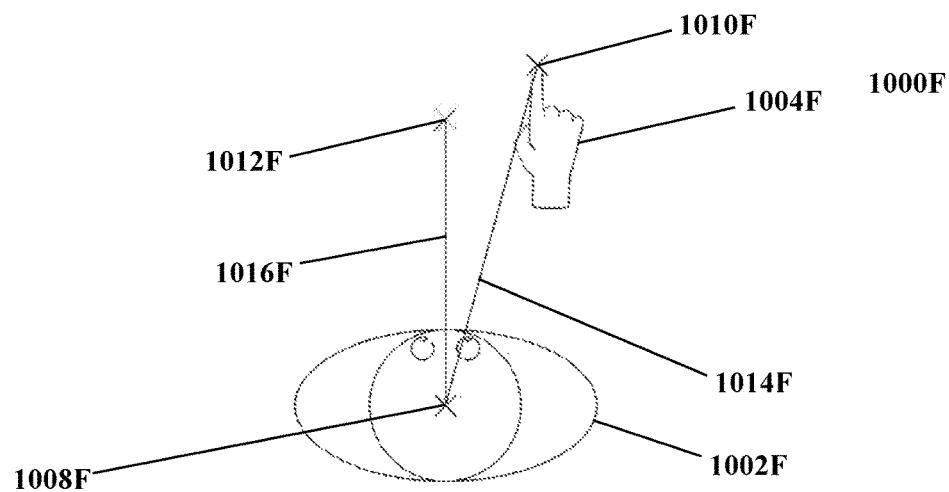

In still another alternative, in FIG. 10F is shown an interface 1000F, user 1002F, manipulator 1004F, reference feature 1008F, manipulation feature 1010F, an entity feature 1012F, manipulation distance 1014F, and entity distance 1016F. However, as may be seen from a comparison with FIG. 9, no entity 1006 is visible in FIG. 10F. The entity feature 1012F and entity distance 1016F remain, so it may be considered that the entity has been de-rezzed, that is, that the entity is not being visibly output. As a result, the obstructivity of the entity is reduced (indeed, an invisible entity may at least arguably present no visible obstruction at all). Given the arrangement of FIG. 10F, the entity may still be present in some sense within the interface, and/or within a system controlling the interface, since position is maintained therefor, distance between the entity and the user 1002F is still determined, etc., but the entity simply is not displayed. However, for other arrangements it may be equally suitable to entirely delete the entity, so that the entity is no longer present within the interface and/or within a controlling system.

In sum, reduction of obstructivity in the present invention may include, but is not limited to, making an entity transparent, increasing the transparency of an entity, displacing an entity angularly, displacing an entity linearly, reducing and/or otherwise changing the size of an entity, de-rezzing an entity, and deleting an entity altogether. As noted elsewhere, the present invention is not particularly limited with regard to how obstructivity may be reduced, and other arrangements than those described and shown herein may be equally suitable.

Figure 10G:
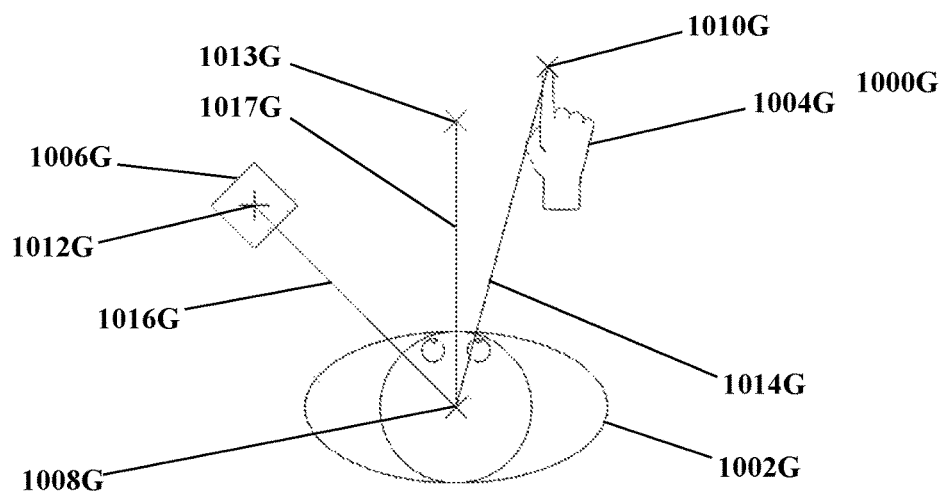

Now with reference to FIG. 10G, therein an arrangement at least somewhat similar to FIG. 10A is shown. The arrangement in FIG. 10G shows an interface 1000G, a user 1002G, a manipulator 1004G, an entity 1006G, a reference feature 1008G, a manipulation feature 1010G, an entity feature 1012G, and a manipulation distance 1014G. FIG. 10G may be considered as an arrangement wherein an entity 1006G has been displaced angularly to reduce the obstructivity of that entity 1006G.

However, in displacing an entity 1006G, changes may result to the position of the entity feature 1012G, and/or to the entity distance 1016G. If the displacement is invoked by a relation wherein the manipulation distance 1014G is greater than the entity distance 1016G, then if the entity distance 1016G changes so that the manipulation distance 1014G is no longer greater than the entity distance 1014G the relation may no longer be positive. If the relation were to be re-checked, for example as part of an ongoing cycle wherein the relation is checked periodically, the displacement of the entity 1006G might (depending on the particulars of the embodiment) be undone. Such an arrangement could lead to the entity 1006G being alternately displaced from an original position to a displaced position and then back to that original position, which may be undesirable under at least certain circumstances.

In order to maintain a displacement of an entity 1006G, for at least some embodiments of the present invention information potentially including but not limited to the prior position of the entity feature and/or the prior entity distance may be retained, and may be considered in maintaining the new position of the entity.

As an illustration thereof, in FIG. 10G the prior entity feature position 1013G is shown therein, as is the prior entity distance 1017G. Consider a determination regarding whether to return a displaced entity 1006G to the former position thereof, thus returning the entity feature 1012G to the prior entity feature position 1013G and restoring the entity distance 1016G to the prior entity distance 1017G. The obstruction relation may be arranged such that in an instance wherein the entity 1006G has already been displaced to reduce obstructivity thereof, in determining whether to maintain the displacement the obstruction relation considers the prior entity feature position 1013G and/or the prior entity distance 1017G rather than the entity feature 1012G and/or the entity distance 1016G after displacement. That is, the relation may determine whether to return to the entity 1006G to the prior position thereof based on, for example, whether the manipulation distance 1014G is greater than prior entity distance 1017G (rather than whether the manipulation distance 1014G is greater than entity distance 1016G).

Given such an arrangement, once the entity 1006G is displaced, the entity 1006G will remain displaced until some other system parameter changes, for example until the manipulator 1004G moves, thus changing the manipulation distance 1014G. That is, once an entity 1006G is displaced, for at least certain embodiments the entity 1006G may remain displaced until the system is otherwise changed, e.g. by the user 1002G moving, by the manipulator 1006G moving, etc.

Depending on the particulars of an embodiment, a prior position of a reference position, a prior position of a manipulation feature, a prior manipulation distance, and/or a prior exception distance may also be maintained and/or considered. Not all such prior data will necessarily be retained in all embodiments, or in all cases within a single embodiment.

For example, some embodiments may retain a position for the prior entity feature 1013G and a prior entity distance 1017G, while not retaining a position for a prior reference feature or a position for a prior manipulation feature. In such instances, the prior entity distance 1017G might change if the user 1002G moves (and thus the reference feature 1008G moves), or if the manipulator 1004G moves (and thus the manipulator feature 1010G moves), but not if the entity 1006G moves (and thus the entity feature 1012G moves).

Figure 11:
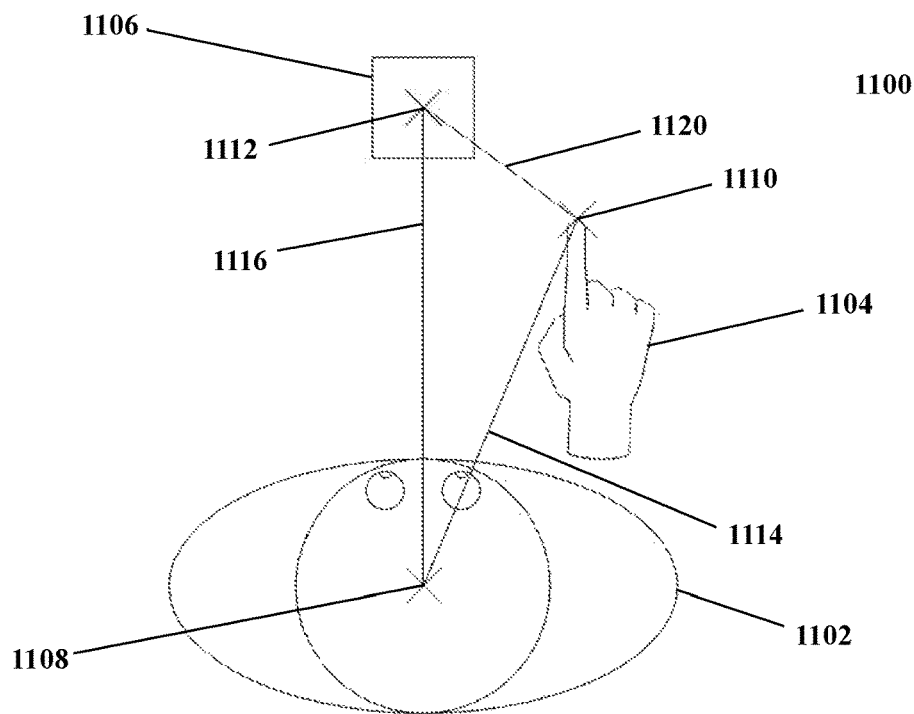
FIG. 11 shows an embodiment of an interface according to the present invention, with an exception distance illustrated therein.

Turning now to FIG. 11, therein is shown an arrangement with an interface 1100, user 1102, manipulator 1104, entity 1106, reference feature 1108, manipulation feature 1110, an entity feature 1112, manipulation distance 1114, and entity distance 1116.

In addition, an exception distance 1120 is depicted in FIG. 11, being the distance between the manipulation feature 1110 and the entity feature 1112.

Previously herein, the operation of the present invention has been described for purposes of simplicity as being based on a simple relation, namely, when the manipulation distance 1114 is greater than the entity distance 1116, the obstructivity of the entity 1106 is reduced. For at least certain embodiments of the present invention, such an approach may be useful. However, the present invention is not limited only to the use of such a relation. Typically, although not necessarily, a relation used to determine whether or not to reduce the obstructivity of the entity 1106 will consider as at least one factor whether the manipulation distance 1114 is greater than the entity distance 1116.

However, the present invention is not particularly limited with regard to what relation or relations may be utilized to govern whether and/or how an entity 1106 is reduced in obstructivity. Notably, even for an arrangement wherein the relation is positive if the manipulation distance 1114 is greater than the entity distance 1116 may be more complex than a simple comparison of exact and/or absolute distances.

For example, for certain embodiments the manipulation distance 1114 might be required to exceed the entity distance 1116 by some threshold. As a more concrete example, the manipulation distance 1114 might be required to be at least 2 inches greater than the entity distance 1116 in order for the obstructivity of the entity 1106 to be reduced. Such an arrangement could, for example, compensate for some degree of uncertainty in the position of the manipulator 1104 and/or the entity 1106.

Similarly, the manipulation distance 1114 might be required to exceed the entity distance 1116 by some factor. Again as a more concrete example, the manipulation distance 1114 might be required to be at least 1.1 times greater than the entity distance 1116 in order for the obstructivity of the entity 1106 to be reduced.

In addition or as an alternative, some minimum distance may be set for the manipulation distance 1114 and/or for the entity distance 1116. In such case, the entity 1106 would not be reduced in obstructivity unless the manipulation distance 1114 and/or the entity distance 1116 exceeded their respective minima. That is, if one or both of the manipulator 1104 and the entity 1106 are very close to the user, the entity 1006 might not be reduced in obstructivity.

Furthermore, the present invention is not limited only to relations wherein only the manipulation distance 1114 and the entity distance 1116 are considered. Other factors also may be considered, and substantially any relation may be utilized wherein, when the relation is determined to be positive, the obstructivity of the entity 1106 is reduced in response.

For example, for at least certain embodiments it may be useful to consider the distance between the manipulation feature 1110 and the entity feature 1112, referred to herein as an exception distance 1120, in addition to considering the manipulation distance 1114 and the entity distance 1116. Typically, although again not necessarily, the exception distance 1120 may be utilized to invoke an exception within a relation. For example, a relation might be of a form wherein the obstructivity of the entity 1106 is to be reduced if the manipulation distance 1114 is greater than the entity distance 1116, unless the exception distance 1120 is less than some threshold (i.e., unless the manipulator 1104 is closer to the entity 1106 than some minimum distance).

Figure 12:
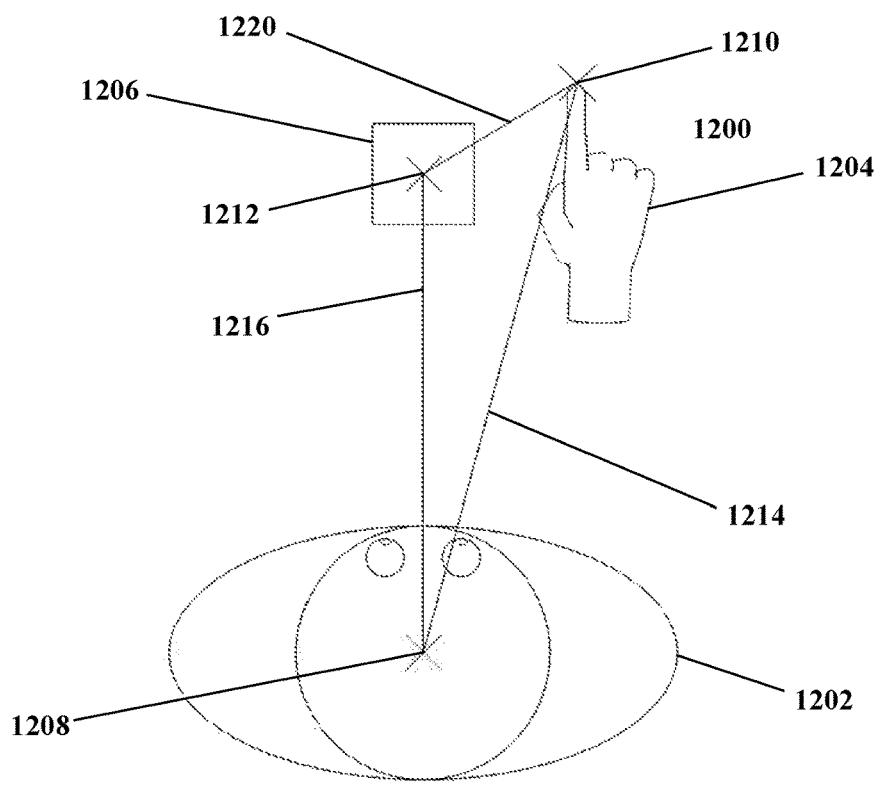
FIG. 12 shows another embodiment of an interface according to the present invention with an exception distance illustrated therein.

Such an arrangement is shown in FIG. 12. Therein is shown an arrangement with an interface 1200, user 1202, manipulator 1204, entity 1206, reference feature 1208, manipulation feature 1210, entity feature 1212, manipulation distance 1214, and entity distance 1216. In addition, an exception distance 1220 is shown. FIG. 12 is at least somewhat similar to FIG. 11, except that the manipulator 1204 is displaced some distance substantially forward (with respect to the user 1202), so that the manipulation distance 1214 is now greater than the entity distance 1216. (By comparison, in FIG. 11 the manipulation distance therein 1114 is visibly less than the entity distance 1116.)

If a relation were utilized for the arrangement shown in FIG. 12 wherein the entity 1206 is reduced in obstructivity when the manipulation distance 1114 is greater than the entity distance 1116, then in FIG. 12 the entity 1206 should be reduced in obstructivity. However, as illustrated the entity 1206 is unchanged in comparison with the entity 1106 in FIG. 11; the obstructivity of the entity 1206 has not been reduced.

As noted above, the relation used for a particular embodiment may include therein an exception dependent on the distance between the manipulation feature 1210 and the entity feature 1212, that is, the exception distance 1220. FIG. 12 shows an exception wherein even though the manipulation distance 1214 is greater than the entity distance 1216, the entity 1206 is not reduced in obstructivity. However, the present invention is not limited only to exhibiting such exceptions in reducing obstructivity based on an exception distance 1220.

Although the exception distance 1220 as illustrated in FIG. 12 is portrayed as a linear distance, an exception distance 1220 may take other forms. For example, an exception distance might be defined as an angular separation between the directions associated with the manipulation distance 1214 and the entity distance 1216.

In addition, although the exception distance 1220 is described in the examples above as a distance wherein the obstruction relation is negative if the exception distance 1220 is less than a threshold therefor, an exception distance 1220 might also be utilized wherein the obstruction relation is negative if the exception distance 1220 is greater than a threshold therefor. For example, if the exception distance 1220 is very large, implying that the manipulator 1204 and the entity 1206 are very far apart, the potential for the entity 1206 to act as an obstruction may be considered insufficient to undertake actions to reduce the obstructivity of the entity 1206. An arrangement wherein multiple exception distances are utilized, for example wherein an obstruction relation is negative if the exception distance is either less than a first threshold or greater than a second threshold, also may be equally suitable.

Furthermore, other exceptions may be utilized in addition to or instead of an exception distance 1220, for example a command word spoken by a user 1202 might invoke an exception, as might a gesture by a user 1202. As another example, if a user 1202 is facing and/or looking at an entity 1206, and/or along a line of sight substantially aligned with an entity 1206, an exception might be invoked (e.g. inferring that the user 1202 intends to interact with an entity 1206 because he or she is looking at that entity 1206, and therefor refraining from reducing the obstructivity of the entity 1206). An entity 1206 that is active, e.g. playing or streaming audio or video, following some user instruction, etc. might be exempted from reduction in obstructivity. An entity 1206 that is not necessarily active now but that has been recently active (i.e. within some exception time period) and/or that has been recently interacted with by a user 1202 might be exempted from reduction in obstructivity. Certain entities 1206 might be partially or entirely exempted from reduction in obstructivity, such as warning notices, critical system icons, etc. Other exceptions also may be equally suitable. The present invention is not particularly limited to what relation or relations may be utilized to determine whether and/or how entities are reduced in obstructivity, or to what exceptions (if any) to that determination may exist.

Figure 13:
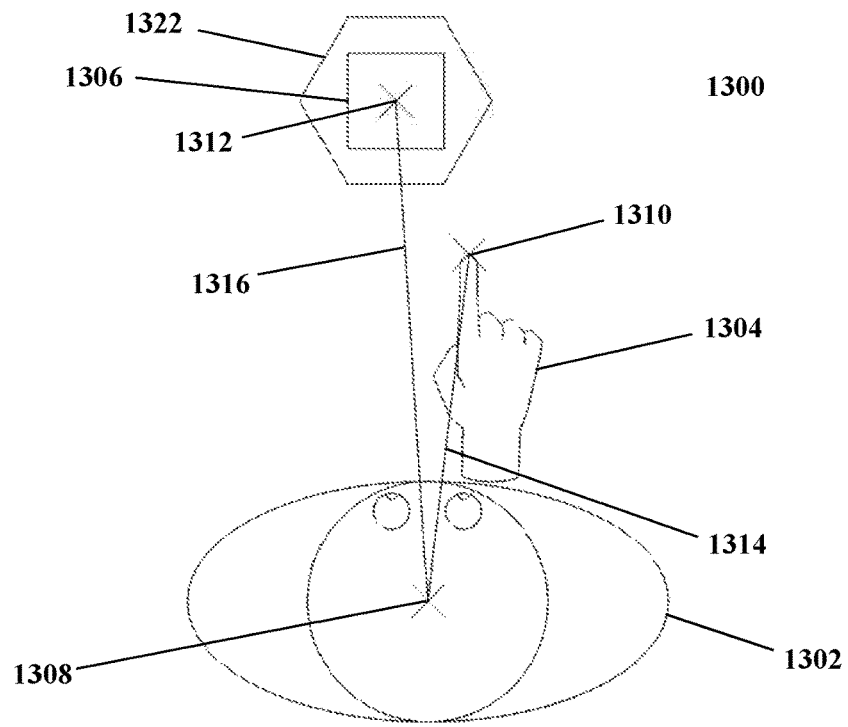
FIG. 13 shows an embodiment of an interface according to the present invention, with an exception construct illustrated therein.

Now with reference to FIG. 13, as stated above factors other than manipulation distance and entity distance may be included in a relation governing whether an entity is to be reduced in obstructivity, those other factors potentially including an exception distance, that is, a distance between the manipulation feature and the entity feature. However, it is emphasized that such factors are not limited only to distances.

The arrangement shown in FIG. 13 includes an interface 1300, user 1302, manipulator 1304, entity 1306, reference feature 1308, manipulation feature 1310, entity feature 1312, manipulation distance 1314, and entity distance 1316.

In addition, an exception construct 1322 is shown. As illustrated, the exception construct 1322 appears as a hexagon, representing a faceted solid or shell substantially enclosing the entity 1306. Although illustrated in FIG. 13, the exception construct 1322 is not necessarily visible, and may for example be merely a data construct considered by a processor, though an exception construct 1322 that is visible also is not excluded from the present invention.

It is pointed out that, as shown in FIG. 13, the manipulation distance 1314 is less than the entity distance 1316.

Figure 14:
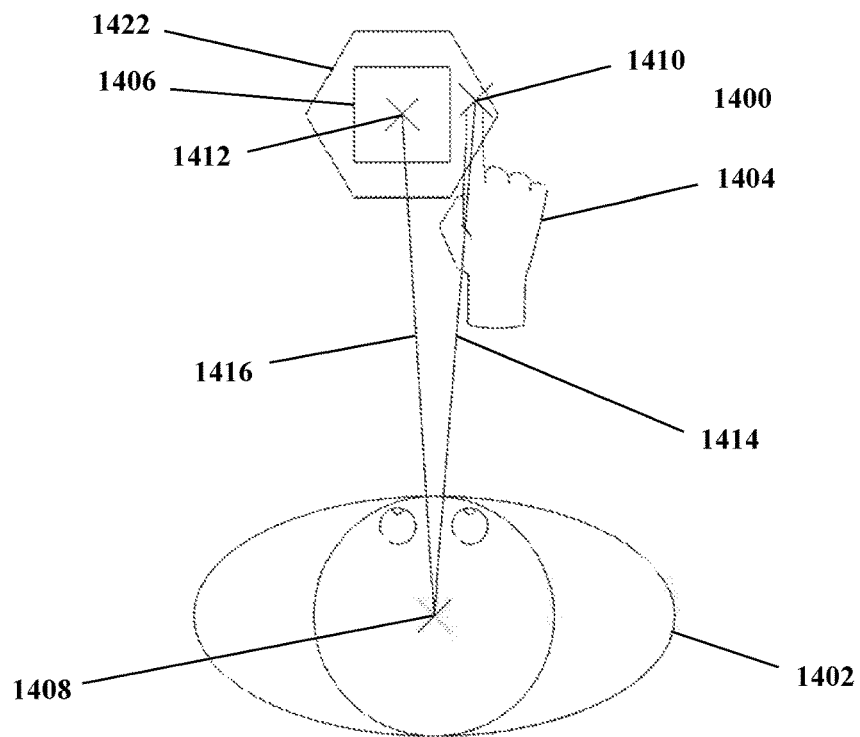
FIG. 14 shows another embodiment of an interface according to the present invention with an exception construct illustrated therein.

Now with reference to FIG. 14, an arrangement at least somewhat similar to that of FIG. 13 is shown, with an interface 1400, user 1402, manipulator 1404, entity 1406, reference feature 1408, manipulation feature 1410, entity feature 1412, manipulation distance 1414, entity distance 1416, and an exception construct 1422.

As may be seen, in FIG. 14 the manipulation distance 1414 is greater than the entity distance 1416. As also may be seen, however, the manipulation feature 1410 is disposed within the exception construct 1422. In addition, even though the manipulation distance 1414 is greater than the entity distance 1416, the entity 1406 is not reduced in obstructivity. It should be understood, then, that the exception construct 1422 constitutes a region wherein, if the manipulation point 1410 is therein, the obstructivity of the entity 1406 is not reduced even if the manipulation distance 1414 is greater than the entity distance 1416.

The exception construct 1422 thus constitutes a form of exception, similar in function to the exception distance 1220 as described with regard to FIG. 12. However, the exception construct 1422 is not a distance, but rather is a region in space. In view of the exception construct 1422 as shown and described, it should be understood that the present invention is not limited only to consideration of distances in determining whether to decrease the obstructivity of an entity 1406, nor is the present invention limited only to distances in terms of determining exceptions.

It is noted that exception features should not necessarily be considered to be "exceptional" by virtue of the term used for them herein. For example, exception constructs 1422 may be present around most or even all entities 1406 for a particular interface, potentially being considered part of the entities 1406 themselves. For example, a virtual reality object might include an exception construct as part of the data and/or structure therefor, or a system might include a default condition applying exception constructs around all virtual objects, etc. Exception features may even, for certain embodiments, be assigned at the discretion of the user, and/or assigned a form by the user.

Figure 15:
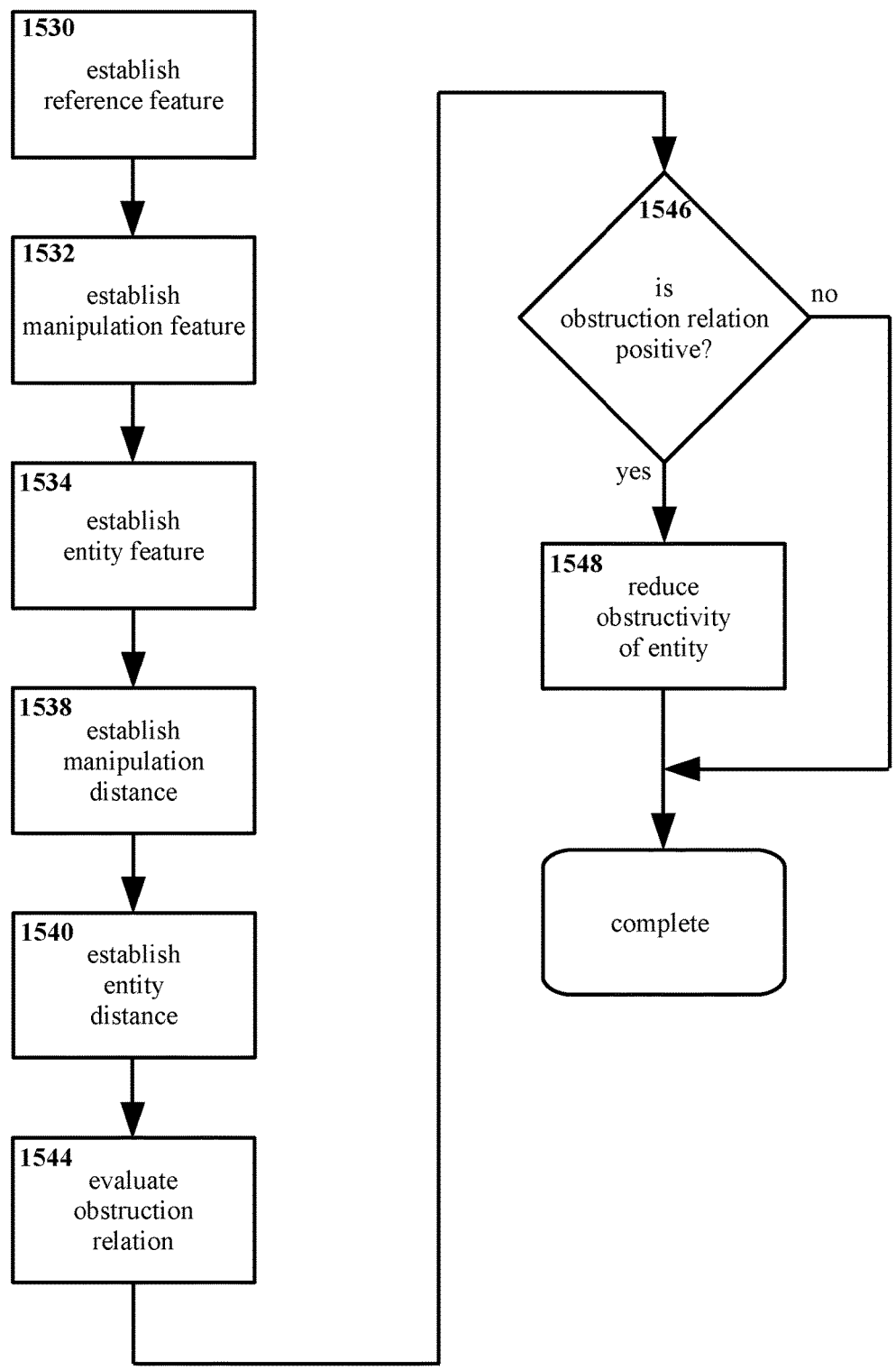
FIG. 15 shows an example method for addressing obstruction within an interface according to the present invention.

Now with reference to FIG. 15, therein is shown an example method for addressing obstruction by entities in an interface according to the present invention.

In the method of FIG. 15, a reference feature is established 1530. The nature and function of reference features has been described previously herein. Briefly, a reference feature represents a point of reference for considering distances, including but not limited to distances to an entity and distances to a manipulator. Considered alternately, a reference feature is used to define and/or determine where a user is. A reference feature typically but not necessarily occupies a position within a user, on the surface (e.g. skin, clothing, etc.) of a user, or near a user. Reference features may be points, but may also be lines, planes, surfaces, three dimensional solids, etc.

Continuing in FIG. 15, a manipulation feature is established 1532. The nature and function of manipulation features also has been described previously herein. Briefly, a manipulation feature represents a position for a manipulator, such as a hand, a fingertip, a stylus, an eye, etc., and/or for purposes of considering a distance between the user and the manipulator. A manipulation feature typically but not necessarily occupies a position within some portion of a user or an object held, worn, or otherwise controlled by a user so as to be readily manipulated by the user, on a surface thereof, and/or near thereto. Manipulation features may be points, but may also be lines, planes, surfaces, three dimensional solids, etc.

An entity feature is also established 1534. The nature and function of entity features also has been described previously herein. Briefly, an entity feature represents a position for an entity, such as a center of mass, a surface, some significant point or other structure, etc., and/or for purposes of considering a distance between the user and the entity. An entity feature typically but not necessarily occupies a position within some portion of the respective entity, on a surface thereof, and/or near thereto. Entity features may be points, but may also be lines, planes, surfaces, three dimensional solids, etc.

As has been previously noted, multiple reference features, manipulation features, and/or entity features may be established in certain embodiments of the present invention.

In considering establishing a reference feature 1530, establishing a manipulation feature 1532, and establishing an entity feature 1534 (and likewise for other uses elsewhere herein) the term "establish" should be understood to be broadly defined. For example, establishing a reference feature may constitute defining a particular location such as an arbitrary point on or in a user, identifying some visible feature of a user, utilizing a mark or tracking feature intended for such use, approximating or calculating some feature such as a center of mass of a user, for example by processing images of the user, a user or other actor actively assigning a point or other feature, etc. Similarly, establishing a manipulation feature and/or an entity feature may be conducted in many ways, depending on the particulars of the embodiment. The present invention is not particularly limited with regard to manner of establishing reference features, manipulation features, and/or entity features.

Continuing in FIG. 15, a manipulation distance is established 1538. As previously described, the manipulation distance represents the distance between the reference feature and the manipulation feature, and/or between the user and the manipulator.

An entity distance is also established 1540. As also previously described, the entity distance represents the distance between the reference feature and the entity feature, and/or between the user and the entity.

The present invention is not particularly limited with regard to how the manipulation distance, entity distance, and/or other distances that may be of concern are established. Typically, though not necessarily, sensor information may be utilized. For example, manipulation distances and/or entity distances may be established by evaluation of images that include the user, manipulator, and entity therein. For certain embodiments, stereo images and/or depth sensors (including but not limited to visible and infrared structured light sensors) may be particularly suitable, though this is an example only.

An obstruction relation is evaluated 1544. Briefly, the obstruction relation is a consideration, typically though not necessarily mathematical in nature, as to whether a particular entity poses an obstruction to a particular viewer or user utilizing an interface. The obstruction relation may be simple, for example "is the manipulation distance greater than the entity distance?" However, as previously described the relation may be more complex, may consider factors other than manipulation distance and entity distance, may include exceptions based on distance, area, user actions or commands, etc. The present invention is not particularly limited with regard to the invention.

For certain embodiments, wherein the obstruction relation is that the manipulation distance must be greater than the entity distance, step 1544 might be considered colloquially as "compare manipulation distance to entity distance".

Other obstruction relations may include, but are not limited to, considerations such as those following. An obstruction relation might address whether the manipulation distance is at least equal to the entity distance. An obstruction relation might address whether the manipulation distance is at least some fraction or ratio of the entity distance. An obstruction relation might address whether the manipulation distance is within some range of the entity distance. Other arrangements also may be equally suitable.

In addition, the present invention is not limited only to consideration of manipulation distance and entity distance with regard to an obstruction relation, nor is consideration of manipulation distance with respect to entity distance necessarily required for all embodiments. For example, relative motion may be considered in addition or instead of distances, e.g. is the manipulation feature and/or the entity feature moving with respect to one another and/or the reference feature? Direction, speed, acceleration, etc. of such motions may be considered. Position of the manipulation feature with respect to the entity feature (as opposed to only the distances of the manipulation feature and entity feature from the reference feature) also may be considered.

Features other than the manipulation distance and entity distance may be considered for the obstruction relation. For example, the line of sight, field of view, etc. of a viewer may be considered. As a more particular example, the viewer relationship may be positive only for entities that are within the viewer's field of view, that are within some linear or angular distance of the viewer's line of sight, etc. Similarly, for embodiments utilizing a particular device, properties of the device such as the fields of view of cameras or other sensors may be considered for the obstruction relation.

Features other than geometry may also be considered for the obstruction relation. For example, whether a particular entity associated with an entity feature has been active within some period of time, has been identified as a "favorite" or otherwise indicated for special consideration, etc. By extension, for arrangements with multiple entities, different entities (and their associated entity distances) may be subject to different obstruction relations.

Moving on in FIG. 15, a determination is made 1546 as to whether the obstruction relation is positive. For the example immediately above, this might be stated as "is the manipulation distance greater than the entity distance?" However, as previously described, the present invention is not limited only to such a relation.

If the obstruction relation is positive—to continue the example above, if the manipulation distance is greater than the entity distance—then the method proceeds with step 1548. If the obstruction relation is negative—if the manipulation distance is not greater than the entity distance—then the method proceeds to completion.

If, as noted above, the obstruction relation is positive, the obstructivity of the entity is reduced 1548. As has been previously described, a reduction in obstructivity of an entity may vary considerably, including but not limited to displacing the entity linearly or angularly, reducing the size of the entity, making the entity transparent and/or increasing the transparency of the entity, de-razzing the entity, and deleting the entity. Other arrangements also may be equally suitable.

Although FIG. 15 shows the method therein as being complete following step 1548 (if the relation is positive, or step 1546 if the relation is negative), it is emphasized that the method in FIG. 15 is an example only. Other steps, other functions, etc. may be incorporated into the method, and/or other methods may be executed in combination with the method according to the present invention. In addition, for at least certain embodiments at least some portion of the method may repeat, e.g. in an ongoing loop that continues to establish the manipulation distance and entity distance, to evaluate the obstructivity relation, and to reduce the obstructivity of the entity if the relation is found to be positive.

Figure 16:
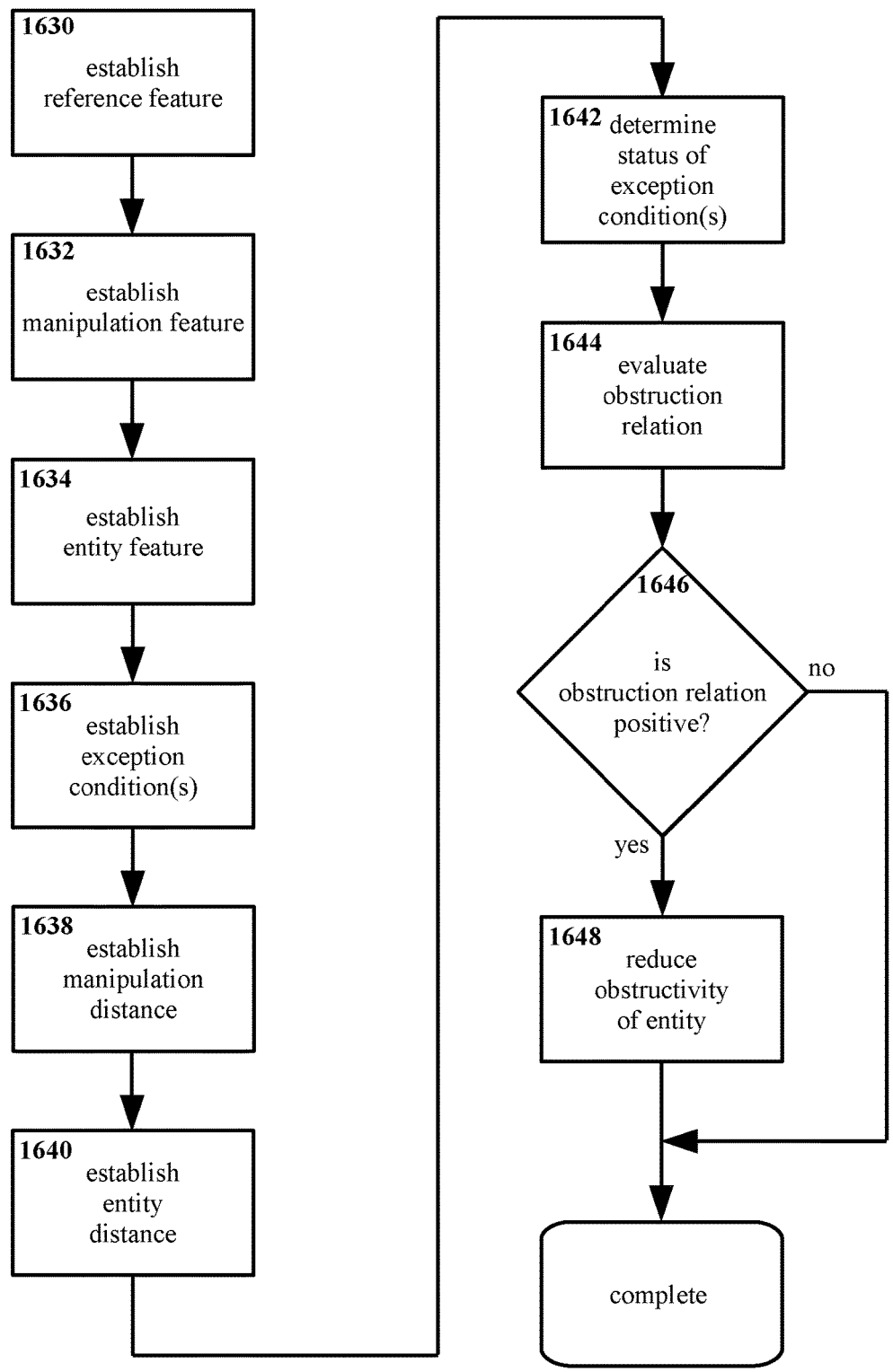
FIG. 16 shows another example method for addressing obstruction within an interface according to the present invention, enabling an exception therein.

Turning now to FIG. 16, therein is shown another example method for addressing obstruction by entities in an interface according to the present invention, this example method incorporating therein consideration of exceptions.

In the method of FIG. 16, a reference feature is established 1630, a manipulation feature is established 1632, and an entity feature is established 1634, similarly to the method in FIG. 15. However, in the method of FIG. 16 at least one exception condition is established 1636. Exceptions have been described previously herein, Briefly, an exception is an additional factor that may affect an obstructivity relation, for example rendering the outcome of the relation negative when absent the exception condition the relation would have been positive. Exception conditions include, but are not limited to, an exception distance between the manipulation feature and the entity feature being less than some threshold, the manipulation point being within some exception construct, a user command being delivered such as a gesture or word, an entity being a "favorite" or "recommended", having been activated within some time period, etc. Likewise, additional factors such as relative motion (speed, direction, acceleration, etc.) may be considered in at least some embodiments for purposes of exceptions.

Moving on in FIG. 16, a manipulation distance is established 1638 and an entity distance is established 1640, similarly to the method in FIG. 15.

In addition, the status of any exception conditions (as established in step 1636) is established 1642. The present invention is not particularly limited with regard to how the status of exception conditions may be established. It will be understood that suitable manners for establishing the status of exception conditions may depend at least in part upon the nature of the exception conditions themselves. For example, the status of an exception condition relating to an exception distance between the manipulation feature and the entity might be established by evaluating sensor data from imagers and/or depth sensors, while the status of an exception condition relating to a spoken command might be established by evaluating input from an audio sensor, etc. Other arrangements may be equally suitable.

Continuing in FIG. 16, the obstruction relation is evaluated 1644. This is at least somewhat similar to step 1544 in FIG. 15, however for the arrangement in FIG. 16 typically (though not necessarily) at least one exception condition may be considered in evaluating the obstruction relation. For example, for an exception condition relating to an exception distance between the manipulation feature and the entity, that exception distance may be considered as part of the obstruction relation.

A determination is made 1646 as to whether the obstruction relation is positive.

If the obstruction relation is positive, then the method proceeds with step 1648, wherein the obstructivity of the entity is reduced 1648. If the obstruction relation is negative, then the method proceeds to completion.

Again, although FIG. 16 shows the method therein as being complete following step 1648 (if the relation is positive, or step 1646 if the relation is negative), this is an example only, and other steps, other functions, etc. may be incorporated into the method, and/or other methods may be executed in combination with the method according to the present invention. Likewise, for at least certain embodiments at least some portion of the method may repeat.

Descriptions herein referencing both FIG. 15 and FIG. 16, as well as other descriptions herein, refer to obstruction relations. Although the function and properties of obstruction relations have been described herein, it may at this point be useful to briefly describe several specific examples thereof. For obstruction relations according to the present invention, suitable arrangements may include, but are not limited to, the following.

As an example of an obstruction relation according to the present invention, if the manipulation distance is greater than the entity distance, then the relation is positive. Otherwise, the relation is negative.

As another example of an obstruction relation according to the present invention, if the manipulation distance is greater than the entity distance by at least a threshold quantity therefor, then the relation is positive. Otherwise the relation is negative.

As yet another example of an obstruction relation according to the present invention, if the manipulation distance is greater than the entity distance by at least a threshold factor therefor, then the relation is positive. Otherwise the relation is negative.

As yet another example of an obstruction relation according to the present invention, if the manipulation distance is greater than the entity distance by at least a threshold factor therefor, then the relation is positive, excepting if at least one of the manipulation distance and the entity distance is less than a threshold therefor in which case the relation is negative. If the manipulation distance is not greater than the entity distance, then the relation is negative.

As another example of an obstruction relation according to the present invention, if the manipulation distance is greater than the entity distance, then the relation is positive, excepting if an exception distance representing a distance between the manipulation feature and the entity feature is less than a threshold quantity therefor (whether linear, angular, etc.) in which case the relation is negative. If the manipulation distance is not greater than the entity distance, then the relation is negative.

As another example of an obstruction relation according to the present invention, if the manipulation distance is greater than the entity distance, then the relation is positive, excepting if an exception distance representing a distance between the manipulation feature and the entity feature is greater than a threshold quantity therefor (whether linear, angular, etc.) in which case the relation is negative. If the manipulation distance is not greater than the entity distance, then the relation is negative.

As another example of an obstruction relation according to the present invention, if the manipulation distance is greater than the entity distance, then the relation is positive, excepting if the manipulation feature is disposed within an exception construct in which case the relation is negative. If the manipulation distance is not greater than the entity distance, then the relation is negative.

As another example of an obstruction relation according to the present invention, if the manipulation distance is greater than the entity distance, then the relation is positive, excepting if an exception stimulus is delivered, possible exception stimuli including but being not limited to user postures, user gestures, and user verbal commands, wherein if the exception stimulus is present then relation is negative. If the manipulation distance is not greater than the entity distance, then the relation is negative.

As yet another example of an obstruction relation according to the present invention, if the manipulation distance is greater than the entity distance, then the relation is positive, Otherwise, the relation is negative. However, an exception may exist wherein once the relation has been found to be positive and if the entity in question has been displaced in response thereto, the relation remains positive regardless of the relationship between the manipulation distance and the entity distance so long as the manipulation distance is greater than the prior entity distance.

Figure 17:
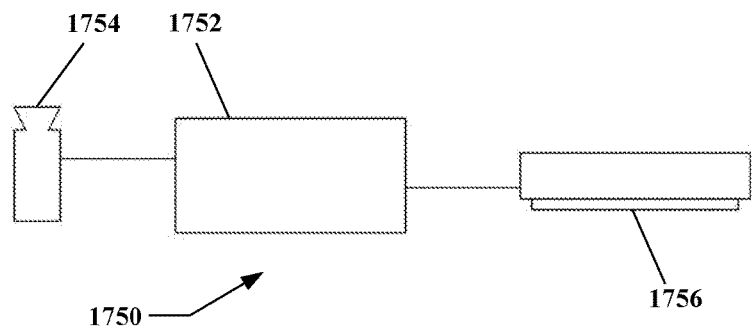
FIG. 17 shows an example apparatus according the present invention in schematic form.

Moving on to FIG. 17, therein is shown a schematic illustration of an example embodiment of an apparatus 1750 for addressing obstruction by entities in an interface according to the present invention.

As shown in FIG. 17, the example apparatus 1750 includes a processor 1752, at least one sensor 1754 in communication with the processor, and at least one outputter 1756 in communication with the processor.

The sensor 1754 is adapted to sense (or at least provide information regarding) the manipulation distance between a reference feature for a user and a manipulation feature selected by said user. The sensor 1754 is also adapted to sense (or provide information regarding) the entity distance between the reference feature and an entity feature for an entity.

A range of devices may be suitable for use as the sensor 1754. As illustrated in FIG. 17, the sensor 1754 is an imager, adapted to capture images and/or video. A range of imagers, including but not limited to CMOS and CCD cameras, may be suitable. Moreover, sensors other than imagers likewise may be equally suitable including but not limited to depth sensors (e.g. visible and/or infrared structured light sensors).

The processor 1752 is adapted to determine whether an obstruction relation is positive. For example, for certain embodiments the processor 1752 may be adapted to determine whether the manipulation distance is greater than the entity distance, with the relation being positive if the manipulation distance is greater than the entity distance and negative if the manipulation distance is not greater than the entity distance. Typically although not necessarily the processor 1752 may rely on information obtained from the sensor 1754, above.

The processor 1752 also is adapted to establish a reduced obstructivity of the entity if the obstruction relation is positive. To continue the example above, the processor 1752 may be adapted to establish a reduced obstructivity of the entity of the manipulation distance is greater than the entity distance. In establishing reduced obstructivity, the processor 1752 may be adapted to establish a suitable displacement of the entity in question so as to reduce the obstructivity thereof, to establish a suitable reduction in size of the entity, to establish a suitable degree of transparency for the entity, to de-rez and/or delete the entity, etc.

The present invention is not particularly limited with regard to the choice of processor 1752. A range of general-purpose, special-purpose, and embedded systems may be suitable for use as the processor 1752. Suitable processors 1752 include but are not limited to digital electronic microprocessors. Although the processor 1752 is referred to in at least some places herein as a self-contained physical device for purposes of clarity, this is not required, and other arrangements may be suitable. For example, the processor 1752 may constitute two or more physical processors working cooperatively, a processing capability in a network without a well-defined physical form, etc.

The outputter 1756 is adapted to reduce the obstructivity of the entity, in response to a establishment made by the processor 1752 as described above. For example, for an outputter 1756 in the form of a visual display, the entity in question might be moved, shrunken, made transparent, etc. in the display.

The present invention is not particularly limited with regard to the type of outputter 1756. Typically, although not necessarily, the outputter 1756 may be a visual display. A range of devices may be suitable for use as the outputter 1756, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable. Furthermore, as noted the present invention is not limited only to the use of visual displays as an outputter 1756.

The manner by which the processor 1752 is in communication with the sensor 1754 and display 1756 is not particularly limited. As illustrated in FIG. 17, components are shown to communicate by wire link, but other arrangements, including but not limited to wireless communication, may be equally suitable.

Figure 18:
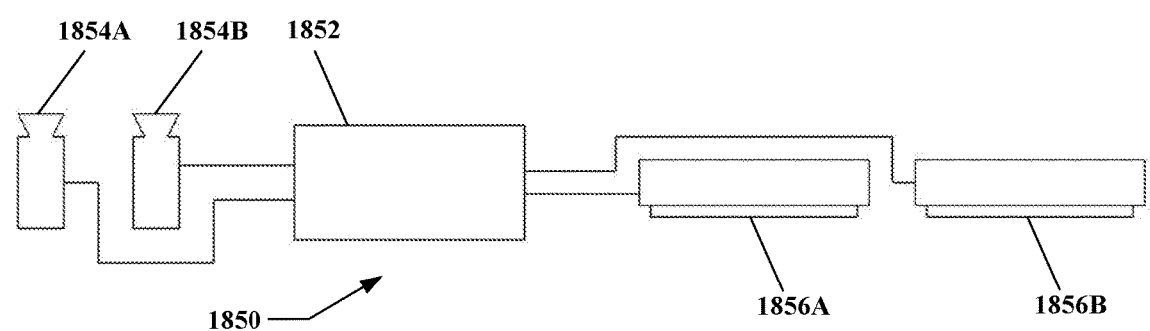
FIG. 18 shows another example apparatus according the present invention in schematic form, with multiple sensors and outputters.

Turning to FIG. 18, therein is shown a schematic illustration of another example embodiment of an apparatus 1850 for addressing obstruction by entities in an interface according to the present invention. As shown in FIG. 18, the example apparatus 1850 includes a processor 1852.

The present invention is not particularly limited with regard to the number and/or type of sensors and/or outputters. As illustrated in FIG. 18, the apparatus therein includes two sensors 1854A and 1854B. Such an arrangement might be useful, for example, in generating stereo information using the sensors 1854A and 1854B (assuming the sensors 1854A and 1854B are disposed in a stereo arrangement), potentially generating data for establishing positions and/or distances such as the reference feature, manipulation feature, entity feature, manipulation distance, and/or entity distance.

Similarly, the example embodiment of FIG. 18 shows an arrangement having two outputters 1856A and 1856B. Such an arrangement might be useful, for example, in delivering stereo output using outputters 1856A and 1856B (assuming the outputters 1856A and 1856B are disposed in a stereo arrangement), potentially providing to the user and/or some other viewer, system, observer etc. output representing three dimensional positions and/or distances.

Figure 19:
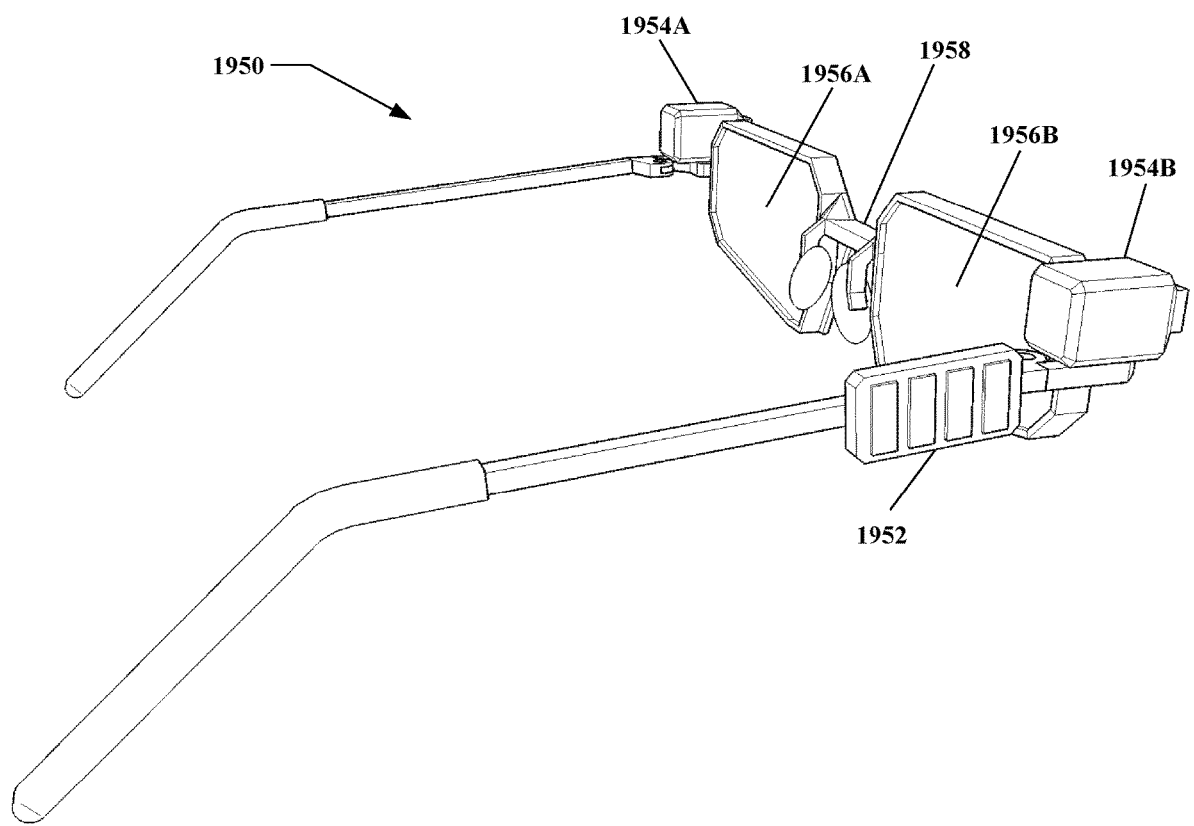
FIG. 19 shows an example apparatus according the present invention in the form of a head mounted display, in perspective view.

Now with reference to FIG. 19, it is noted that the present invention is not particularly limited with regard to form, and may be disposed on and/or incorporated into many shapes and/or other devices. Suitable configurations include but are not limited to the example shown in FIG. 19, wherein an apparatus according to the present invention is illustrated in the form of a head mounted display resembling a pair of glasses.

As shown in FIG. 19, the example embodiment of the apparatus 1950 therein includes a body 1958 having a form similar to a pair of glasses, and adapted to be worn in a similar fashion. A processor 1952 adapted is disposed on the body 1958.

The apparatus 1950 also includes sensors 1954A and 1954B disposed on the body 1958, illustrated as imagers in a stereo configuration. The apparatus 1950 further includes outputters 1954A and 1954B disposed on the body 1958, illustrated as visual displays also in a stereo configuration.

It is noted that in the configuration shown, the body 1958 is configured and the sensors 1954A and 1954B are disposed thereon such that when the body 1958 is worn by a user, the sensors 1954A and 1954B would be substantially aligned with the lines of sight of the user's eyes, and could potentially encompass fields of view at least somewhat comparable to those of the user's eyes, assuming sensors 1954A and 1954B with fields of view similar in extent to those of the user.

Similarly, in the configuration shown the body 1958 is configured and the outputters 1956A and 1956B are disposed thereon such that when the body 1958 is worn by a user, the outputters 1956A and 1956B would be proximate to and substantially in front of the user's eyes.

However, it is emphasized that the arrangement in FIG. 19 is an example only, and that other arrangements may be equally suitable.

Figure 20A:
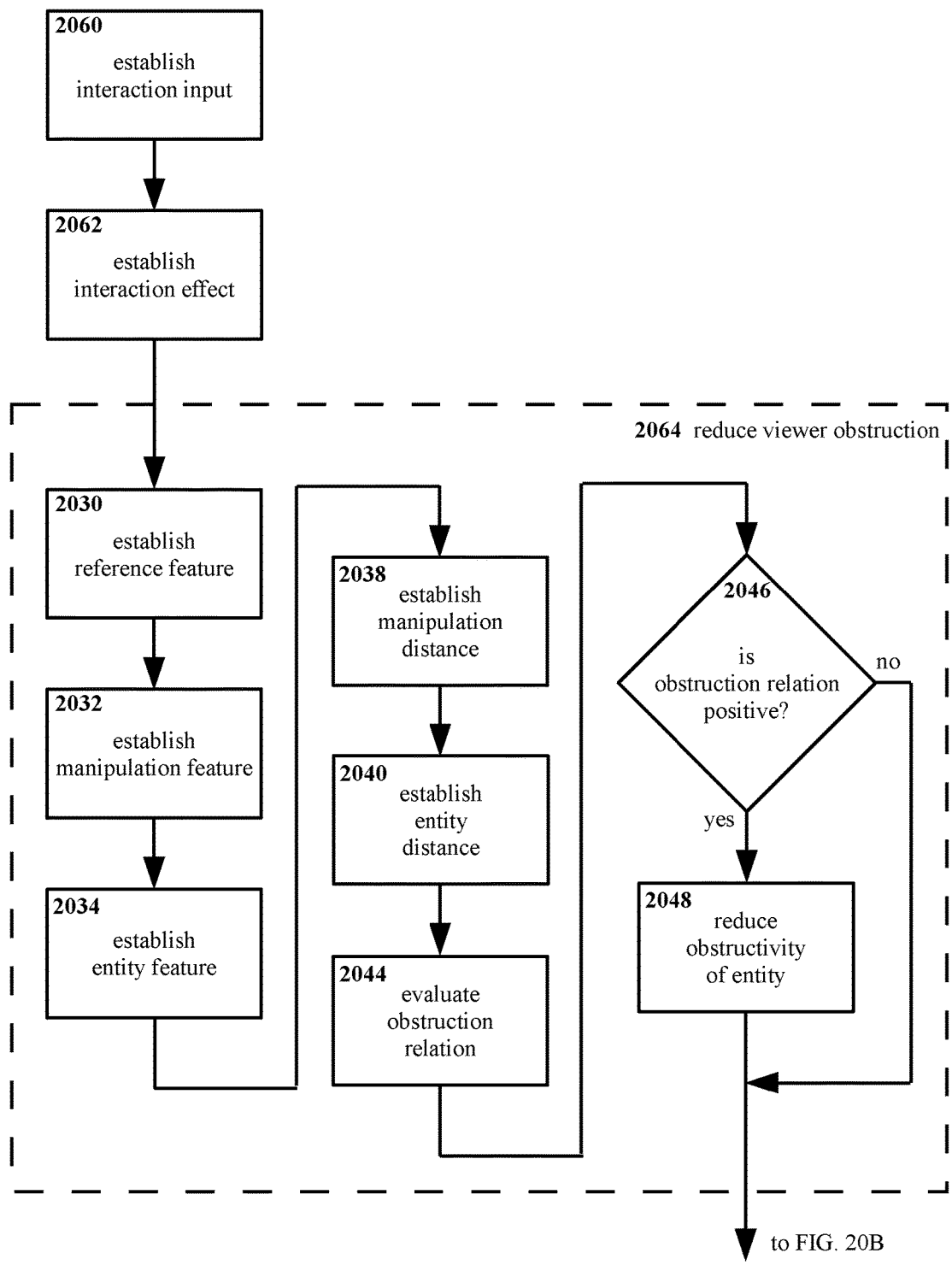
FIG. 20A and FIG. 20B show an example method for controlling a device through an example arrangement of the present invention.
Figure 20B:
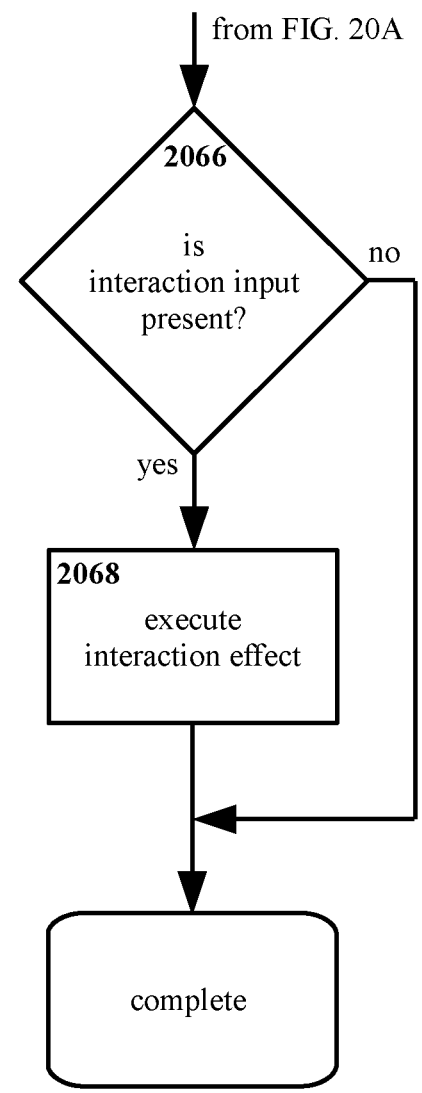

Now with reference to FIG. 20A and FIG. 20B, the present invention may be utilized with and/or incorporated into many forms, including but not limited to processors, devices and systems having processors therein, and devices and systems controlled in whole or in part by processors. Now with reference to FIG. 20A and FIG. 20B therein is shown an example of a use-case utilizing an embodiment of the present invention in implementing some effect, such as executing a command within a processor (though the present invention is not limited only thereto). As shown and described commands might be implemented within an interface with obstruction therein reduced through the present invention so as to facilitate command input and/or detection.

Figure 21A:
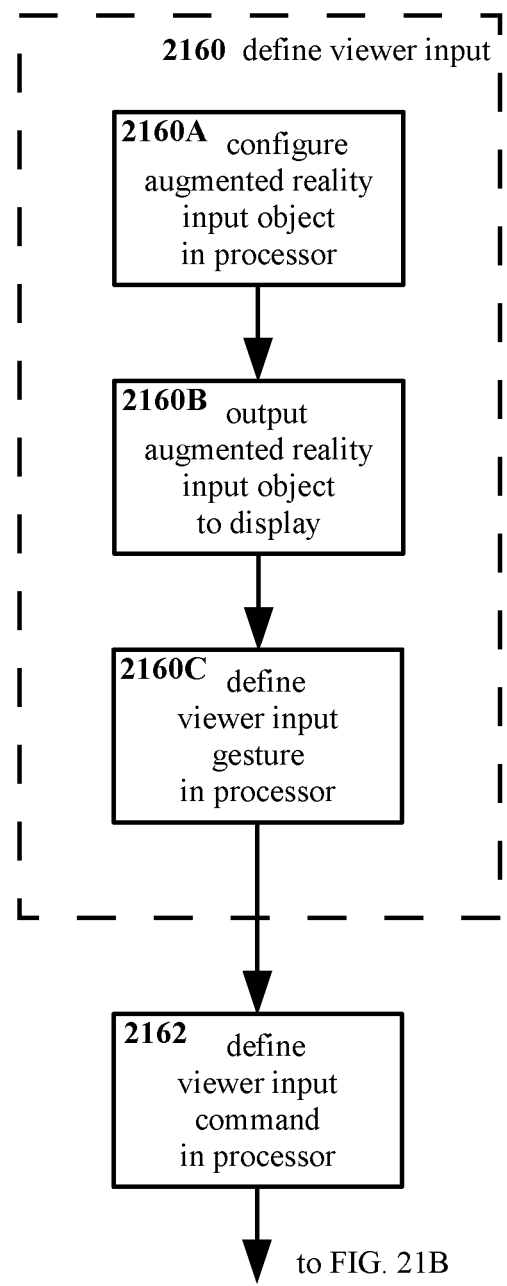
FIG. 21A through FIG. 21C show another example method for controlling a device, specifically a head mounted display, through an example arrangement of the present invention.
Figure 21B:
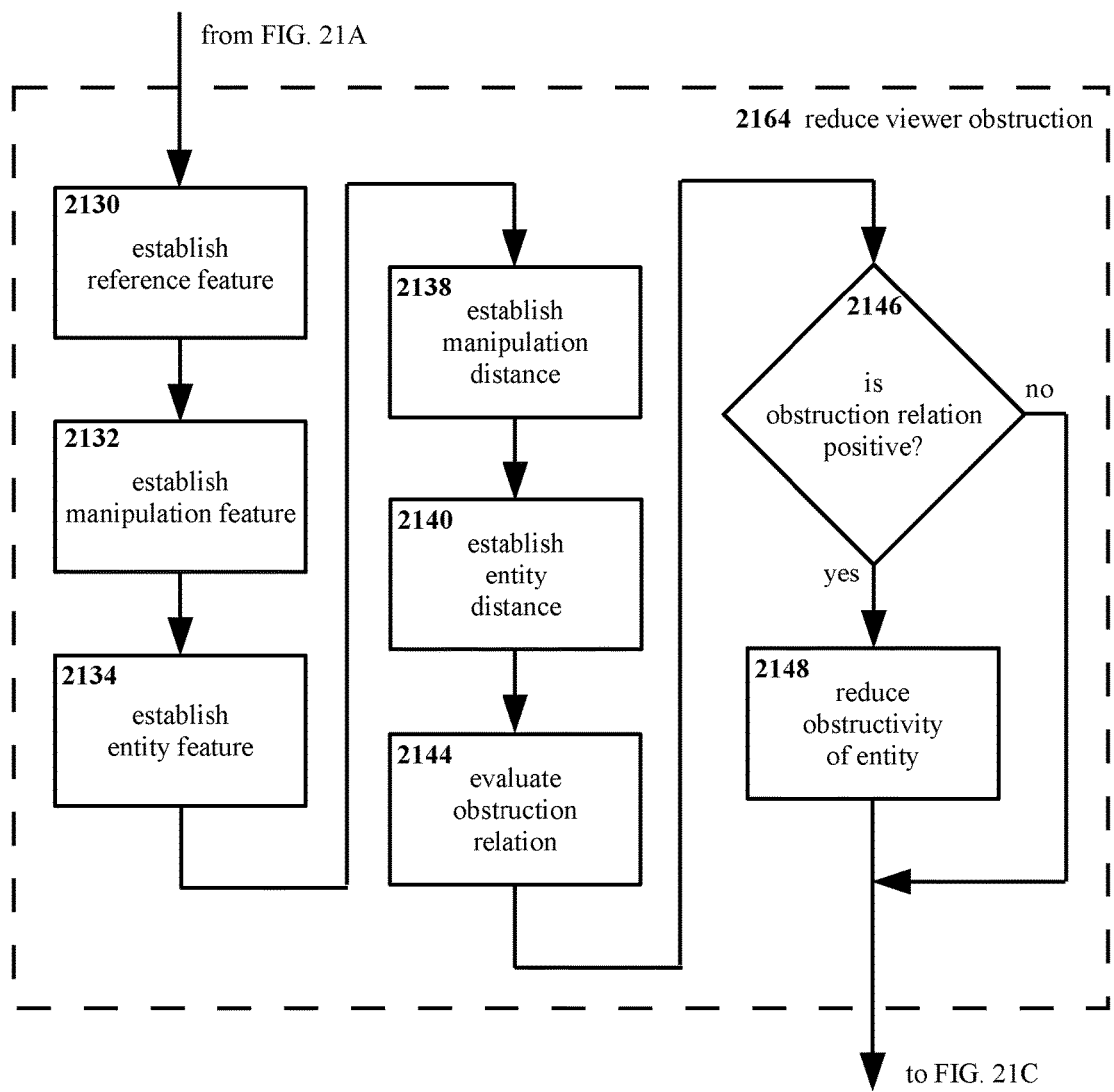
Figure 21C:
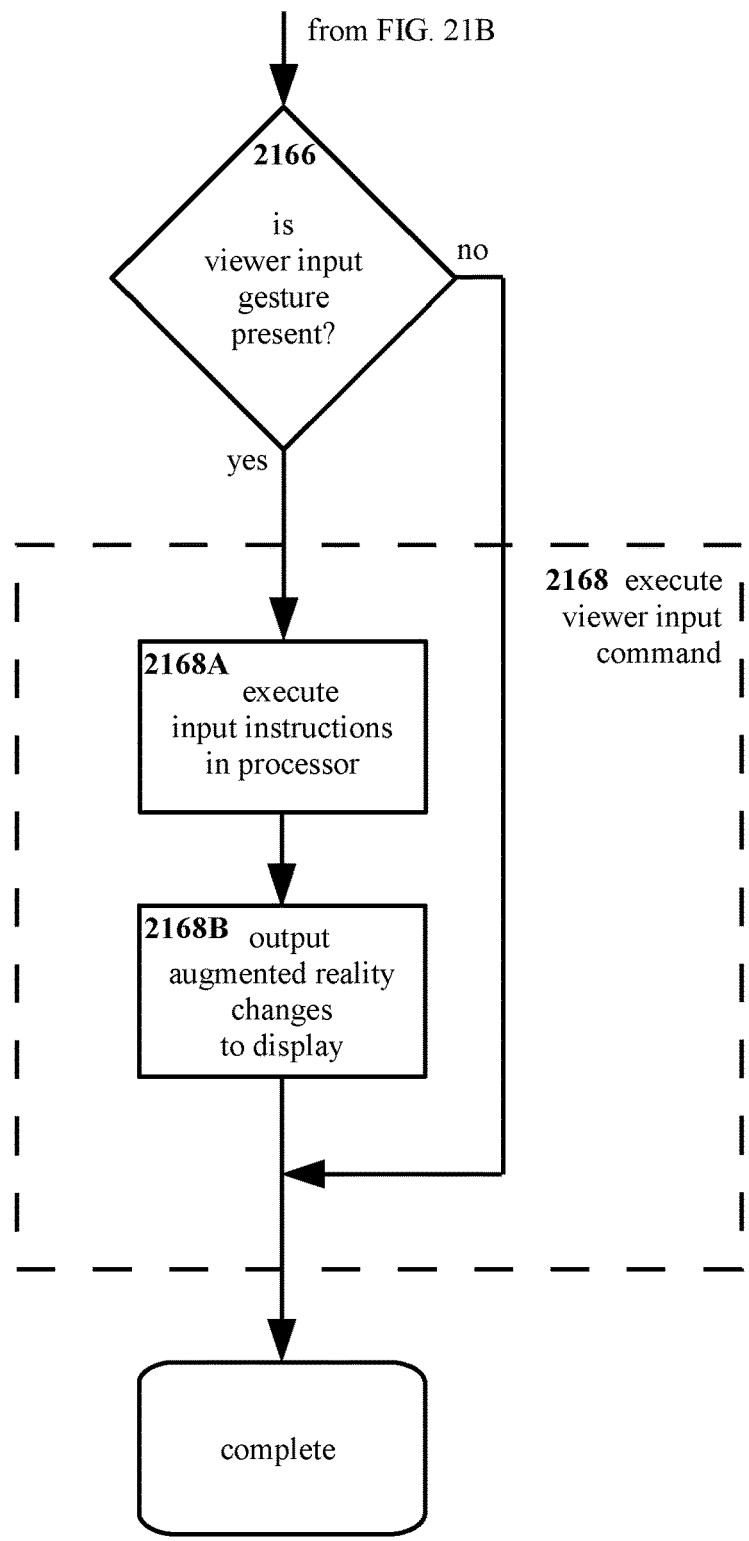

It is noted that a similar but more detailed example to that in FIG. 20A and FIG. 20B is presented in FIG. 21A, FIG. 21B, and FIG. 21C. Where FIG. 20A and FIG. 20B show an overview of a larger method that may incorporate an embodiment of the present invention, FIG. 21A through FIG. 21C illustrate more specifically how individual steps in an example method according to the present invention (similar to that already shown and described herein) may be understood to serve within a practical implementation such as a head-mounted display. It is emphasized however that the present invention is not limited only to head-mounted displays, nor to the specific example methods shown in FIG. 20A and FIG. 20B and/or in FIG. 21A through FIG. 21C.

In FIG. 20A, an interaction input is established 2060. The interaction input may be for example a command to a processor or device. Suitable interaction inputs may include, but are not limited to, hand gestures, hand postures, gestures and/or postures with a stylus, light beam, or other indicator, inputs from devices such as a mouse, keyboard, joystick, etc., voice commands, and direct data inputs such as from remote and/or external systems. Typically though not necessarily, the interaction input may be established 2060 by instantiating executable instructions and/or data on a processor. More concretely, for a gesture input the parameters of the relevant gesture might be defined in such fashion that the gesture is recognizable by the processor, e.g. so as to specify two held together being swiped vertically downward, etc.

An interaction effect is established 2062. The interaction effect may be for example an action carried out by a processor or device, in response to the interaction input. Suitable interaction effects may include, but are not limited to, commands executed in or on an operating system, application, database, or other body of data and/or executable instructions, changes to the output of a visual display or other output system, changes to a graphical or other environment such as a virtual and/or augmented reality environment (whether currently displayed or not), communications sent to some external system, etc. Typically though not necessarily, the interaction effect may be established 2062 by instantiating executable instructions and/or data on a processor. More concretely, an interaction effect to run an application might include commands to load executable instructions for the program onto a processor and initiate execution thereof.

Although only a single interaction input and interaction effect are shown to be established 2060 and 2062 in FIG. 20A, embodiments of the present invention may include multiple interaction inputs and/or interaction effects. Moreover, a one-to-one correspondence therebetween is not required (though such also is not excluded); that is, one interaction input might trigger two or more interaction effects, and/or one interaction effect might be triggered by two or more interaction inputs.

Continuing in FIG. 20A, viewer obstruction is reduced 2064. For example, given an arrangement where an interaction input is to be a gesture delivered within a graphical interface by a user viewing that graphical interface, obstruction (if present) of the user's view of that graphical interface is reduced. For purposes of the example in FIG. 20A, reducing 2064 viewer obstruction may be considered to include certain substeps, at least somewhat similar to steps already described herein (for example with regard to FIG. 15).

Namely, a reference feature is established 2034, a manipulation feature is established 2032, and an entity feature is established 2034. Reference features, manipulation features, and entity features according to the present invention and the establishion thereof have been described previously herein.

A manipulation distance is established 2038, and an entity distance is established 2040. Manipulation distances and entity distances according to the present invention and the establishment thereof have been previously described herein.

An obstruction relation is evaluated 2044, and a determination is made 2046 as to whether the obstruction relation is positive. If the determination is positive, the obstructivity of one or more relevant entities is reduced 2048; if not, step 2048 is skipped. Obstruction relations, associated determinations, and reducing obstructivity according to the present invention have been previously described herein.

Now with reference to FIG. 20B, the method continues with a determination as to whether the interaction input is present 2066. For example, if the interaction input is to be a hand gesture implemented at some point in space, is the hand gesture present at the proper point in space? If the determination is positive (e.g. if the hand gesture is present), the method continues in step 2068. If the determination is negative (e.g. if the hand gesture is not present), the method skips step 2068.

Still with reference to FIG. 20B, if the determination in step 2066 is positive, the interaction effect is executed 2068. For example, if the interaction effect (as established in step 2062) is to run an application, then the associated executable instructions may be instantiated onto a processor and the execution thereof initiated.

Although FIG. 20B shows the method therein as being complete following step 2068, this is an example only, and other steps, other functions, etc. may be incorporated into the method, and/or other methods may be executed in combination with the method according to the present invention. Likewise, for at least certain embodiments at least some portion of the method may repeat.

Now with reference to FIG. 21A through FIG. 21C, therein is shown another example of a use-case utilizing an embodiment of the present invention. The arrangement shown in FIG. 21A through FIG. 21C provides a more particular example, such as might be applicable to interaction with and/or control of a head mounted display such as that illustrated and described with regard to FIG. 19. Although the method in FIG. 21A through FIG. 21C is presented as an example, the present invention is not limited only thereto, nor to head mounted displays generally.

In the example method of FIG. 21A, a viewer input is defined 2160. This may be at least somewhat similar to step 2060 in FIG. 20A. As may be seen in FIG. 21A, step 2160 may be considered (for at least certain embodiments) as several substeps (though the present invention is not limited only to such arrangements). Namely, an augmented reality input object is configured 2160A in a processor, such as a processor in a head mounted display. The augmented reality input object may for example be an icon, marking, or other target for delivering viewer input. The augmented reality input object is then outputted 2160B to a display, such as may be present in a head mounted display. That is, for this particular example the augmented reality input object may be made visible to a person wearing the head mounted display, such that the viewer may view and thus interact with the augmented reality input object. In addition, a viewer input gesture is defined 2160C in the processor. For example, the gesture may be some specific hand motion that is to be executed at, near, etc. the displayed position of the augmented reality input object.

Still with reference to FIG. 21A, a viewer input command is defined 2162 in the processor. This may be at least somewhat similar to step 2062 in FIG. 20A. For purposes of the example in FIG. 21A, the viewer input command may be considered for example to include one or more instructions to be executed in the processor if and when the viewer input (defined in step 2160) is found to be present, one or more changes to the augmented reality environment as displayed to the viewer via the head mounted display, etc.

Continuing in FIG. 21B, viewer obstruction is reduced 2164. For example, for an augmented reality environment having multiple visual entities therein, and having an augmented reality input object therein (as noted with regard to steps 2160A and 2160B), and with a viewer input gesture to be delivered (as noted with regard to step 2160C) to that augmented reality input object within the augmented reality environment, certain obstructions as may be present between the viewer's point of view and the augmented reality input object may be altered so as to reduce the obstruct thereof as displayed to the viewer.

For purposes of the example in FIG. 21B, reducing 2064 viewer obstruction may be considered to include certain substeps, at least somewhat similar to steps already described herein (for example with regard to FIG. 15).

Namely, a reference feature is established 2134, a manipulation feature is established 2132, and an entity feature is established 2134. Reference features, manipulation features, and entity features according to the present invention and the establishion thereof have been described previously herein.

A manipulation distance is established 2138, and an entity distance is established 2140. Manipulation distances and entity distances according to the present invention and the establishment thereof have been previously described herein.

An obstruction relation is evaluated 2144, and a determination is made 2146 as to whether the obstruction relation is positive. If the determination is positive, the obstructivity of one or more relevant entities is reduced 2148; if not, step 218 is skipped. Obstruction relations, associated determinations, and reducing obstructivity according to the present invention have been previously described herein.

Moving to FIG. 21C, the method continues with a determination as to whether the viewer input gesture is present 2166. This may be at least somewhat similar to step 2066 in FIG. 20B. If the determination is positive, the method in FIG. 21C continues in step 2168. If the determination is negative, the method skips step 2168.

Still with reference to FIG. 21C, if the determination in step 2166 is positive, the viewer input command is executed 2168. This may be at least somewhat similar to step 2068 in FIG. 20B.

As may be seen in FIG. 21C, step 2168 may be considered (for at least certain embodiments) as several substeps (though the present invention is not limited only to such arrangements). Namely, input instructions are executed 2168A in the processor. This may, for example, include initiating an application, or making some change thereto. In addition, changes to the augmented reality environment are outputted 2168B to the display. For example, the augmented reality input object (i.e. the target for the viewer gesture) might change appearance, move, etc., new augmented reality Objects may appear (e.g. as part of initiating the application noted with regard to step 2168A), etc.

Although FIG. 21C shows the method therein as being complete following step 2168, this is an example only, and other steps, other functions, etc. may be incorporated into the method, and/or other methods may be executed in combination with the method according to the present invention. Likewise, for at least certain embodiments at least some portion of the method may repeat.

The interaction input may be for example a command to a processor or device. Suitable interaction inputs may include, but are not limited to, hand gestures, hand postures, gestures and/or postures with a stylus, light beam, or other indicator, inputs from devices such as a mouse, keyboard, joystick, etc., voice commands, and direct data inputs such as from remote and/or external systems. Typically though not necessarily, the interaction input may be established 2060 by instantiating executable instructions and/or data on a processor. More concretely, for a gesture input the parameters of the relevant gesture might be defined in such fashion that the gesture is recognizable by the processor, e.g. so as to specify two held together being swiped vertically downward, etc.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method, comprising:
    displaying, by a display, a first augmented reality object within an augmented reality interface to a user at a first distance from the user;
    displaying, by the display, a second augmented reality object within the augmented reality interface to the user at a second distance from the user greater than the first distance;
    receiving, by a sensor, an input from a manipulator interacting with the augmented reality interface;
    defining a plane at a center of mass of the user;
    determining, by a processing device, a visual obstructivity level of the first augmented reality object relative to the second augmented reality object based on the plane at the center of mass of the user; and
    reducing, by the processing device, the visual obstructivity level of the first augmented reality object relative to the user in response to detection, by the processing device, that the visual obstructivity level of the first augmented reality object relative to the second augmented reality object impacts a view of the user and/or interaction with the second augmented reality object.

2. The method of claim 1, wherein the method further comprises:
    establishing, by the processing device, an exception factor; and
    displaying, by the display, the first augmented reality object as originally displayed according to the exception factor.

3. The method of claim 2, wherein the exception factor comprises a disposition of a second manipulator.

4. The method of claim 2, wherein the exception factor comprises a user input to override the reduction of the visual obstructivity level.

5. The method of claim 4, wherein the user input comprises at least one of a manipulator attitude, a hand posture, a hand gesture, an eye posture, an eye gesture, or a voice command.

6. The method of claim 1, further comprising determining whether the first augmented reality object is within a line of sight of the user.

7. The method of claim 1, wherein the manipulator is at least one of a body part of the user, or an augmented reality object visible on the augmented reality interface.

8. The method of claim 1, wherein the augmented reality interface is configured to receive input from the user via the manipulator.

9. The method of claim 1, wherein the manipulator comprises at least one of:
    a hand of the user;
    a cursor;
    an augmented reality tool;
    a fingertip of the user; or
    a tip of a physical stylus held by the user.

10. The method of claim 1, wherein at least one of the first distance and the second distance comprises a distance range of at least one of a linear distance or an absolute distance.

11. The method of claim 1, wherein reducing the visual obstructivity level comprises at least one of:
    decreasing an opacity of the first augmented reality object;

replacing the first augmented reality object with an outline of the first augmented reality object;
de-resolving the first augmented reality object;
deleting the first augmented reality object;
decreasing a size of the first augmented reality object; or
changing a position of the first augmented reality object.

12. An apparatus, comprising:
a display to display an augmented reality object within an augmented reality interface to a user;
a sensor to receive an input from a manipulator interacting with the augmented reality interface; and
a processor in communication with the sensor and the display, wherein the processor is to:
define a vertical plane extending through a center of mass of the user;
determine a first linear plane-to-point distance between the vertical plane and the manipulator;
determine a second linear plane-to-point distance between the vertical plane and the augmented reality object;
determine a relative difference between the first linear plane-to-point distance and the second linear plane-to-point distance;
determine a reduced obstructivity level for the augmented reality object; and
display, via the display, the augmented reality object at the determined reduced obstructivity level when the relative difference is below a threshold distance.

13. The apparatus of claim 12, wherein the sensor comprises at least one of an imager, a stereo pair of imagers, a depth sensor, a structured light sensor, or a time of flight sensor.

14. The apparatus of claim 12, wherein the display is configured to allow for direct viewing of a surroundings of the user or to replicate the surroundings of the user in the display.

15. The apparatus of claim 12, wherein at least a portion of the apparatus is wearable by the user.

16. An apparatus, comprising:
a display to:
display a first augmented reality object within an augmented reality interface to a user at a first distance from the user; and
display a second augmented reality object within the augmented reality interface to the user at a second distance from the user;
a sensor to receive an input from a manipulator that interacts with the augmented reality interface; and
a processing device to:
define a plane at a center of mass of the user;
define a first distance range of space as an area between the plane at the center of mass of the user and a first point in space at a threshold distance from the plane at the center of mass of the user;
define a second distance range of space as an area between the first point in space and a second point in space at a threshold distance from the first point in space;
define a third distance range of space as an area between the second point in space and a third point in space at a threshold distance from the second point in space, wherein:
the first distance range is closer to the user than the second distance range and the third distance range; and
the second distance range is closer to the user than the third distance range;
the first augmented reality object is located within the second distance range; and
the second augmented reality object is located within the third distance range;
determine whether the first augmented reality object and the manipulator are both located in the second distance range or the second augmented reality object and the manipulator are both located in the third distance range, wherein:
the first augmented reality object and the manipulator being located in the second distance range indicates that the user intends to interact with the first augmented reality object; and
the second augmented reality object and manipulator being located in the third distance range indicates that the user intends to interact with the second augmented reality object;
in response to the first augmented reality object and the manipulator being located in the second distance range, continuing to display the first augmented reality object at its original visual obstructivity level and the second augmented reality object at its original visual obstructivity level; and
in response to the second augmented reality object and the manipulator being located within the third distance range, reducing the visual obstructivity level of the first augmented reality object relative to the user to allow the user to interact with the second augmented reality object without the first augmented reality object obstructing the user's interaction with the second augmented reality object.

17. The apparatus of claim 16, wherein the display is further to display a third augmented reality object in response to the reduction in the visual obstructivity level of the first augmented reality object.

18. The apparatus of claim 16, wherein the reduction in the visual obstructivity level of the first augmented reality object varies in magnitude over time to produce a fade out and/or fade in effect.

19. The apparatus of claim 16, wherein the reducing the visual obstructivity level of the first augmented reality object comprises removing the first augmented reality object from a field of view of the user.

20. The apparatus of claim 16, wherein the reducing the visual obstructivity level of the first augmented reality object comprises de-resolving the first augmented reality object.

* * * * *